United States Patent
Welker et al.

(10) Patent No.: US 7,209,616 B2
(45) Date of Patent: Apr. 24, 2007

(54) METHOD FOR PRODUCING PARALLEL ARRAYS OF FIBERS

(75) Inventors: David J. Welker, Vancouver, WA (US); Christopher D. Breckon, Ruston, WA (US); Todd E. Holt, Vancouver, WA (US); Christopher A. Richter, Tumwater, WA (US)

(73) Assignee: Paradigm Optics, Incorporated, Vancouver, WA (US)

( * ) Notice: Subject to any disclaimer, the term of this patent is extended or adjusted under 35 U.S.C. 154(b) by 15 days.

(21) Appl. No.: 11/131,065

(22) Filed: May 17, 2005

(65) Prior Publication Data

US 2005/0265675 A1 Dec. 1, 2005

Related U.S. Application Data

(60) Provisional application No. 60/572,318, filed on May 18, 2004.

(51) Int. Cl.
*G02B 6/04* (2006.01)
*C03B 31/023* (2006.01)

(52) U.S. Cl. ......................... 385/115; 65/385

(58) Field of Classification Search ................ 385/115; 65/385
See application file for complete search history.

(56) References Cited

U.S. PATENT DOCUMENTS

| | | | |
|---|---|---|---|
| 3,658,407 A | 4/1972 | Kitano et al. | |
| 4,812,012 A | 3/1989 | Terada et al. | |
| 4,896,941 A | 1/1990 | Hayashi et al. | |
| 5,048,923 A | 9/1991 | Tsumanuma et al. | |
| 5,127,079 A | 6/1992 | Suzuki et al. | |
| 5,222,180 A | 6/1993 | Kuder et al. | |
| 5,881,195 A | 3/1999 | Walker | |
| 5,963,701 A | 10/1999 | Nakamura et al. | |
| 6,041,154 A | 3/2000 | Ono et al. | |
| 6,061,490 A | 5/2000 | Sera et al. | |
| 6,091,872 A | 7/2000 | Katoot | |
| 6,154,594 A | 11/2000 | Fiacco et al. | |
| 6,640,034 B1 | 10/2003 | Charlton et al. | |
| 6,683,898 B2 | 1/2004 | Østergaard | |
| 6,887,423 B2 * | 5/2005 | Van Trump et al. | ........ 264/555 |

(Continued)

OTHER PUBLICATIONS

Brennan et al., "Plastic Fiberoptic Image Guides for Endoscopes," Nanoptics, Inc., pp. 1-9, accessed at http://www.nanoptics.com/paper.htm Nov. 5, 2002.

Nanoptics, Inc., "Fiberoptic Tutorial," pp. 1-9, accessed at http://www.nanoptics.com/tutorial.htm Oct. 16, 2003.

Suzuki, Fumio, "Novel Plastic Image-Transmitting Fiber," *SPIE*, vol. 1592, pp. 150-157 (1991).

(Continued)

*Primary Examiner*—Sung Pak
*Assistant Examiner*—Tina M. Wong
(74) *Attorney, Agent, or Firm*—Leydig, Voit & Mayer, Ltd

(57) ABSTRACT

A method to fabricate solid linear fiber arrays, multi-hole arrays and inverse multi-hole arrays (i.e. space-separated arrays). These arrays may be used for example as capillary arrays, photonic crystal fiber, tissues engineering scaffolds and templates, imaging guides, thermal photovoltaic device, and thermal electric devices. The number of fibers used to fabricate the structures is variable. Individual fibers are deposited into a fiber depository and made to bond together. The deposition may be performed in line with fiber production or may be performed after producing the fibers through fiber rewinding. The bonded linear fiber array may be removed from the fiber depositories.

18 Claims, 22 Drawing Sheets

U.S. PATENT DOCUMENTS

2002/0118937 A1    8/2002   Broderick et al.
2002/0168157 A1   11/2002   Walker et al.
2003/0228096 A1   12/2003   Parker et al.
2004/0180186 A1*   9/2004   Jackson et al. .......... 428/306.6

OTHER PUBLICATIONS

Vinci Fine Instruments, "Fiber Optic Tutorial," pp. 1-10, accessed at http://www.vinci.it/tutorial-Fibre.htm Oct. 16, 2003.

* cited by examiner

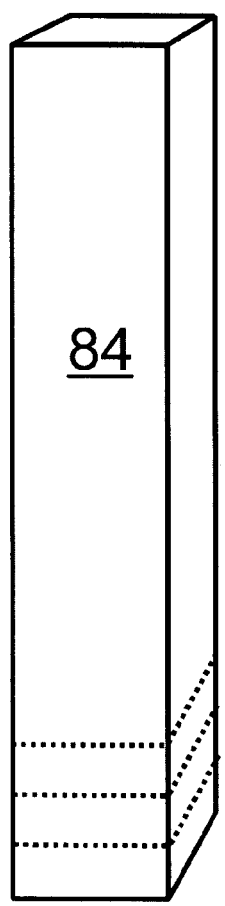
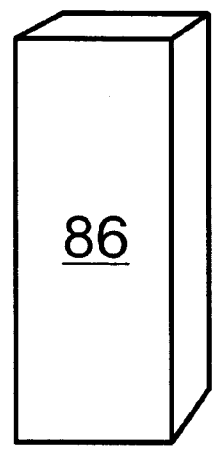
Figure 5b
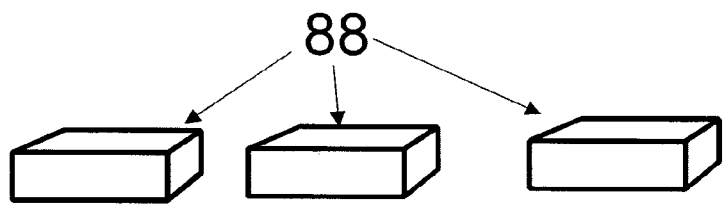
Figure 5c
Figure 5a

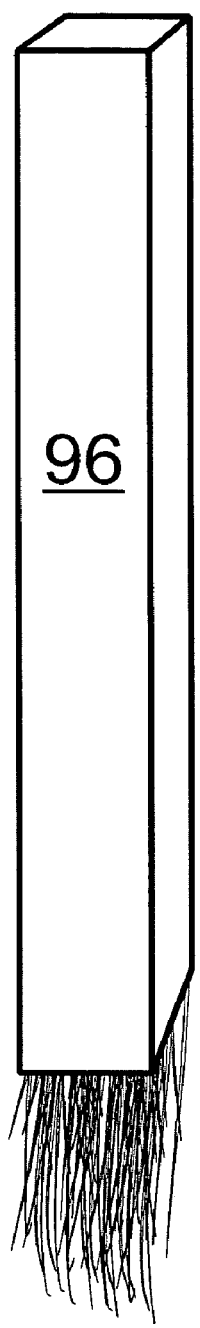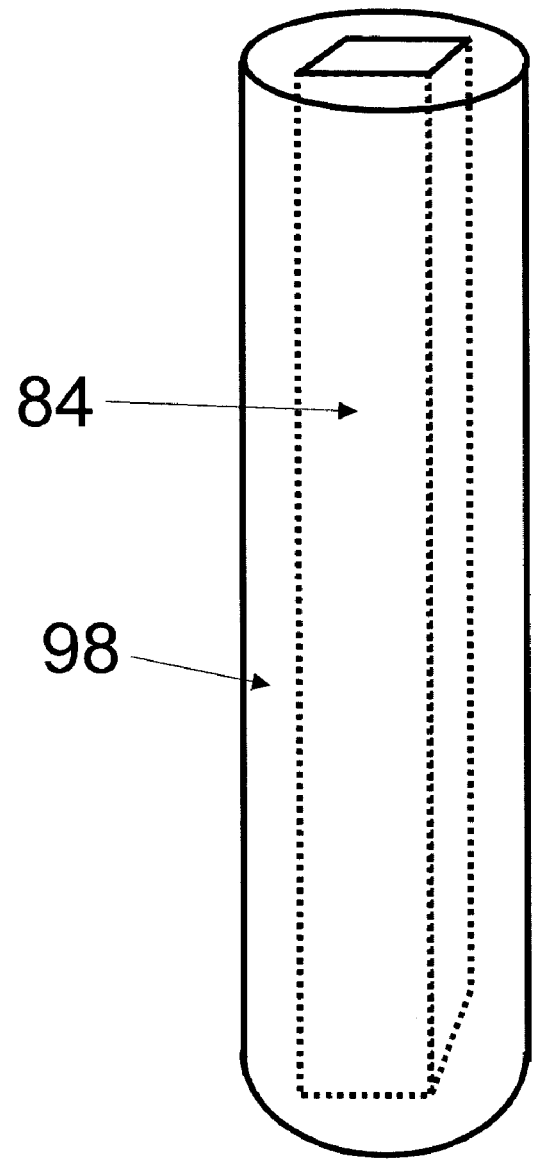
Figure 7a
Figure 7b

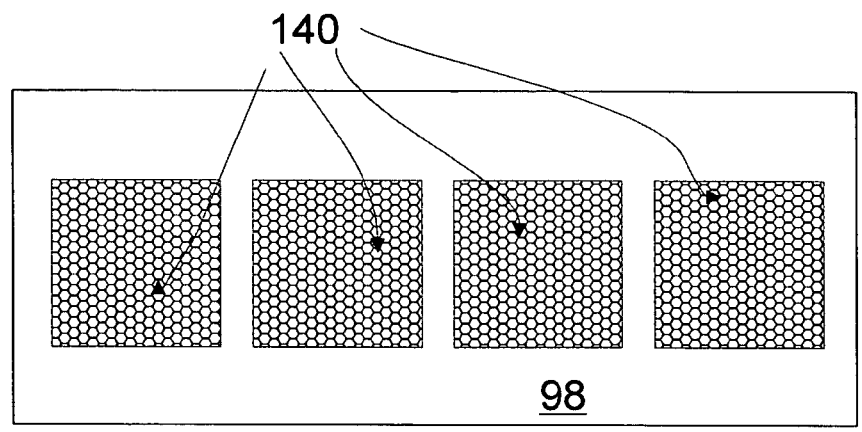
Figure 13a
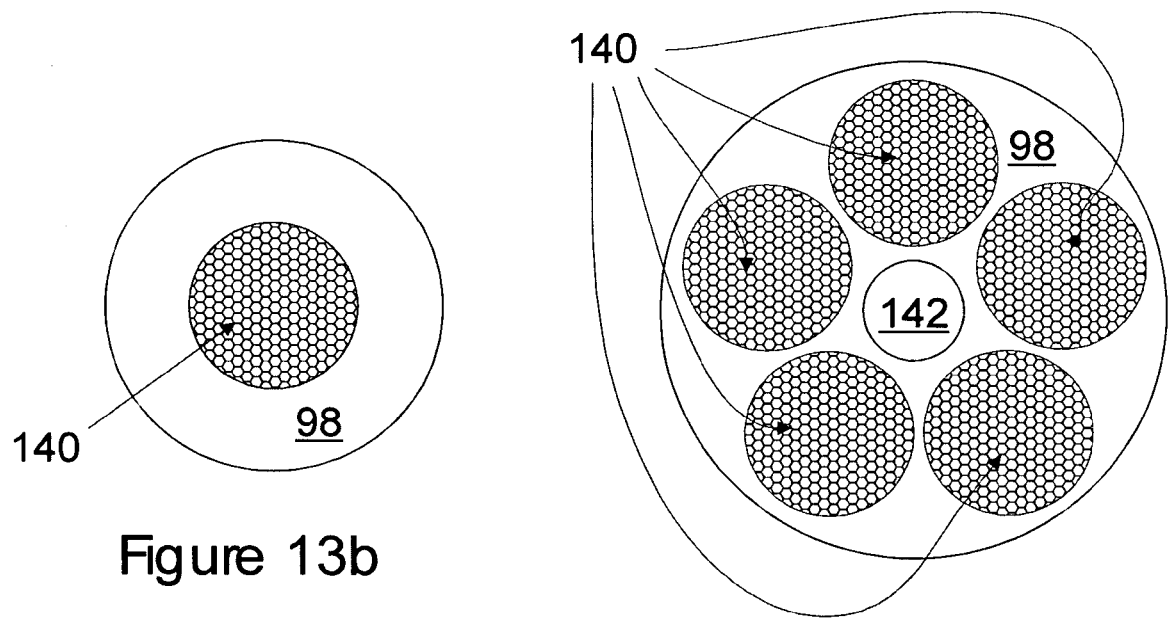
Figure 13b
Figure 13c

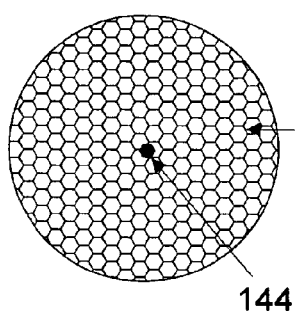 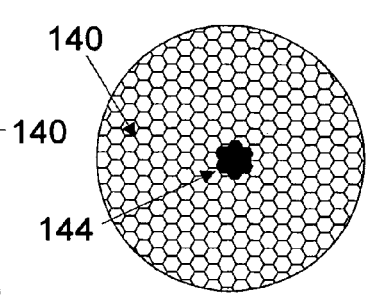 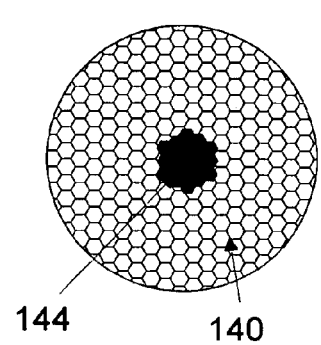
Figure 14a　　　　　Figure 14b　　　　　Figure 14c
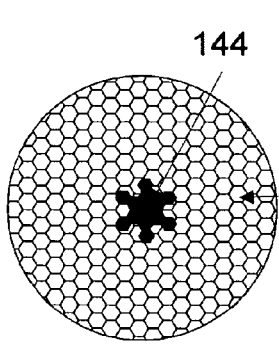 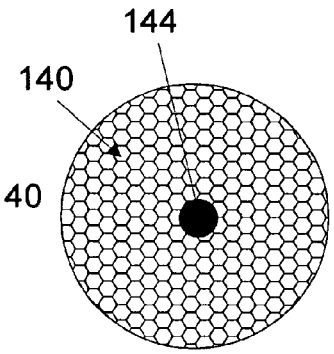 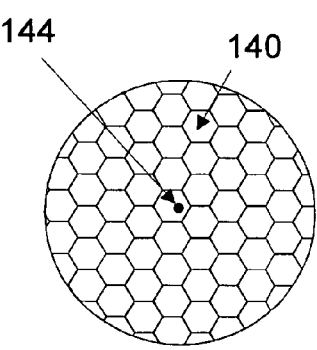
Figure 14d　　　　　Figure 14e　　　　　Figure 14f

208 →

284 →

METHOD FOR PRODUCING PARALLEL ARRAYS OF FIBERS

REFERENCE TO RELATED APPLICATION

This application claims the benefit of U.S. Provisional Application No. 60/572,318, filed May 18, 2004, and incorporated herein by reference.

TECHNICAL FIELD OF THE INVENTION

The present invention relates to producing products from fibers, and more specifically to the production of parallel arrays of fiber or strand-like components.

BACKGROUND OF THE INVENTION

The present invention is directed to any field that utilizes parallel arrays of fiber or strand-like components on a scale of a few nanometers to a few millimeters. Such structures may be composed of solid fibers, hollow fibers, or combinations of both solid and hollow fibers. Example structures include, but are not limited to, imaging structures (image fibers, guides, bundles, tapers, and faceplates), multi-hole arrays (photonic crystal structures, capillary arrays), tissue engineering structures (templates, scaffolds), space separated arrays (fiber arrays, post arrays), thermal photovoltaic devices, thermal electric devices, nanoarrays (hole, post), and other devices. Prior art fabrication methods for such structures are quite varied, and some of these methods are described in the following sections.

Imaging Structures

In the field of imaging, and more specifically coherent image guides such as fiber bundles, tapers, and faceplates, it is desirable to create image guides having a very high resolution and maximum brightness at a low cost. Such products, if produced at a low enough cost, can enable a new generation of disposable imaging instruments for medical and industrial use, and hold the promise of increased safety for consumers while also reducing medical costs. For instance, a truly disposable endoscope that is disposed after a single operation will eliminate the transfer of infections from endoscopes due to improper cleaning. While several efforts have demonstrated coherent image guides having either high resolution or somewhat low cost, no image guide product has been introduced to the market that sufficiently satisfies both of these conditions such that truly disposable imaging instruments are available. In addition, medium resolution imaging faceplates, if produced inexpensively, can find mass market consumer application by enabling devices to be manufactured that are too expensive for the market using glass imaging guides.

Imaging guides have long been known in the prior art. Most imaging guides are composed of single core and single clad fibers. Graded index fibers used to form image guides have also long been known in the prior art. Kitano et al, U.S. Pat. No. 3,658,407 (issued 1972), describes the use of graded index fiber to form an imaging guide. In prior art methods for the manufacture of imaging structures, lengths of single core optical fiber (or in some cases, two-dimensional ribbons of single core optical fibers), are fused together under heat and pressure to form a single imaging structure preform, from which imaging structures are fabricated. FIG. 1 shows individual fibers 50 being fused to form an imaging structure perform 52.

Prior art examples also include U.S. Pat. No. 5,881,195, wherein Walker et al. teach a method and instrumentation for fusing optical fibers together to form an image guide. The method described does not indicate how the fibers are bundled prior to fusing. Bundling single fiber lengths is a labor-intensive and costly task that cannot support an extremely low cost production method. Hence U.S. patent application 2002/0168157, also by Walker et al., describes a method for automating some of this work, by extruding 1×N (and up to 3×N) sheets of fibers that are subsequently wound on a spool-like apparatus and fused to form a solid image guide boule. This method, however, limits the packing of fibers to a square arrangement in the cross section, which in turn drastically limits the brightness of the image guide, which is a function of the ratio of core area to cladding area in an image guide.

In U.S. Pat. No. 6,091,872, Katoot describes a method for fusing individual fibers together; however the method is limited in that no simple extension for automating the process is provided. Hence, the method as a whole remains labor-intensive and relatively expensive.

Prior art methods for the manufacture of imaging structures are not cost effective due to the difficulty of transferring (and in some cases aligning) single fibers in a single device to be constructed into a single imaging structures. Additionally, prior art methods require multiple redraw steps in order to manufacture high-resolution imaging structures.

In prior art methods for the manufacture of imaging structures, single core fiber or fiber ribbon is drawn onto a spool or other receiving medium, and then transferred to a device that fuses the fibers together to form an imaging structure preform. The process is repeated as necessary until an imaging structure with desired pixel density is attained. These steps are labor intensive and may introduce imperfections, impurities and/or small particles (e.g. dust or microfibers) to the imaging structures.

Repetitive bundle and redraw steps as described in the prior art introduce line and distortion blemishes, which distort an image that is transferred through imaging structures. Physically ordering individual fiber/pixel elements also introduces line and distortion blemishes. In addition, such steps are labor intensive and take considerable time and cost.

Multi-Hole Arrays

Prior art methods of manufacturing multi-hole arrays are quite varied but the generally involve either the bundling of tubular structures or various other processes.

Capillary Arrays

Prior art methods for the manufacture of capillary arrays (including but not limited to capillary tube arrays, capillary array faceplates, capillary array tapers) generally involve the same processes used to fabricate photonic crystal fiber, but may or may not be drawn to reduce their dimensions, depending on the desired dimensions of the end user. Capillary faceplates have also been made using ultrasonic drilling of glass/silica.

Prior art methods lack elements of low-cost and ease of use. They are all labor-intensive and generally involve expensive materials and/or instrumentation to implement them.

Linear Photonic Crystal Structures—Fiber

Photonic crystal fibers are essentially capillary arrays with defects. In the art of photonics, it is desirable to create photonic bandgap effects using highly ordered arrays of repeating material units. Such units may constitute voids or variations in the refractive index of two or more alternating materials. Examples include photonic bandgap or photonic crystal fiber ("holey fiber") and other similar devices that rely on the photonic bandgap effect, such as U.S. Pat. Nos. 6,683,898 and 6,640,034, and U.S. patent applications 2003/0228096, 2004/0013384, and 2002/0118937. Methods for creating such fibers and devices as shown in the prior art rely on time-consuming and high cost methods to produce them. For instance, in one application, many holes must be painstakingly drilled into a solid material cylinder that is subsequently drawn into optical fiber. In another application, silicon-etching techniques must be employed. Prior art methods of fabricating photonic crystal fiber generally involve the bundling of tubes and solid cylinders which are then drawn to desired dimensions. Several drawing steps may be required to obtain final dimensions.

Planar Photonic Crystal Structures—Optical Circuits

Planar photonic crystal circuits are essentially thin sections of capillary arrays with defects. Planar Photonic Crystals Structures (PCS) are materials with a periodic dielectric constant, which provides frequency band gaps for the propagation of light. This property enables full control of light propagation making photonic crystals the building blocks of full optical communication. One major limitation for the widespread use of photonic crystals is the lack of efficient fabrication technologies. Most photonic crystals today are defined using e-beam lithography, a technique that can handle the resolutions required for photonic crystals at telecom wavelengths, but lacks the possibility for industrial application due to long writing times. Other techniques used for the large-scale fabrication of PCS cannot print the fine details required of photonic crystals.

Other Devices

Multi-Hole arrays can also be used as templates to produce other space separated array devices, such as thermoelectric devices and thermophotovoltaic devices. Thermoelectric devices and thermophotovoltaic (TPV) devices are essentially inverse capillary arrays with alternating materials in place of the holes. Thermophotovoltaic (TPV) energy conversion is similar to solar energy conversion using photovoltaic (PV) cells. The PV layer is common to both technologies (of course, the type of PV material differs). The source in the case of TPV conversion is a terrestrial thermal emitter at 1500–2000 K. Compared to the sun; most of the energy from such terrestrial emitters are lower energy (or longer wavelength) regions. The PV cell converts that portion of radiation with energy higher than its band gap into useful electrical power. Improving the efficiency as well as power density of TPV converters will make this technology more viable.

Tissue Engineering Structures

Tissue engineering scaffolds are used to aid the growth of tissue both in vivo and ex-vivo. Tissue engineering scaffold templates are used to fabricate scaffolds. Scaffolds may be biodegradable.

Parallel Channel Scaffolds are most commonly used to guide the growth of nerve tissue, (central nerves or peripheral nerves). Parallel Channel Scaffolds are capillary arrays constructed with suitable materials.

Recently there has been tremendous growth in the field of nerve repair. Biodegradable polymer implants have been used to act as a scaffolding to promote nerve regeneration in the peripheral nervous system. Work is just starting on their use in the central nervous system. Structural scaffolding made from a biodegradable polymer has several key benefits. First, it can be designed for optimum axon growth and organization (the parallel channels serve to guide the growth across the injured area). Second, the biodegradable polymer may contain agents that promote axon growth; as the polymer slowly degrades, it can provide time-released, localized delivery of such agents. Therefore, biodegradable polymer scaffolding provides an ideal cellular and molecular structure for the regrowth of axons across a spinal cord legion, providing for the eventual neurological recovery.

Biodegradable polymer scaffolds are the basis for nearly every tissue engineering application. The scaffolds are used to provide a template for cell seeding and extracellular matrix formation. Once the scaffold has been seeded with cells, it can be used to repair damaged organs, repair bone defects, aid in the acceptance of organs during transplant, and may even be used in the engineering of complete internal organs.

Beyond providing a template for cell seeding, polymer scaffolds may also provide structural integrity, allow for the ingrowth of tissue, and in some cases allow for the inclusion of growth factors, proteins and/or genes, which can aid in the tissue regeneration process. The size and shape of the pores in the scaffold has been shown to play an important role in the success of the tissue generation. Therefore, to make an optimum scaffold for a given type of tissue, the pore size and pore shape need to be tightly controlled.

Past attempts to fabricate biodegradable polymer scaffolds have been limited by available technology. Currently, the majority of existing attempts to make them have been based on porous foams via particulate-leaching techniques. This approach results in amorphous, irregular structures that are unsuitable for channeling the growth of nerve cells. Heat compression and extrusion techniques have also been attempted, but these techniques do not allow for the incorporation of therapeutic agents into the structure, since the processes destroy these agents. In addition, extrusion cannot adequately produce the small structures needed for research. There have been other attempts to fabricate these structures-they all have serious limitations. The most promising to date has been the use of modified polymer free-form fabrication machines. The most advanced of such machines are essentially three-dimensional printers; they place small drops of polymers in a controlled manner and buildup the appropriate structure. Complicated processes have been utilized to enable these machines to build appropriate structures. The best resolution reported to date has been 25 microns, with a reported possible 6-micron resolution in future designs. In addition, many polymers are not compatible with the required process these machines must use. The machines are also prohibitively expensive ($80,000–$400,000) and must undergo extensive, irreversible modifications to suit the conditions for each particular polymer. To overcome the limitations of these machines, they are used to fabricate a template of the desired structure, which is then used to mold an inverse of the desired structure in a more appropriate material, which is then used to mold the desired final tissue scaffold.

Fiber array scaffolds (also an example of a space separated array, see below) are scaffolds that contain an array of fiber like elements. Fiber array scaffolds are inverse capillary arrays. Fiber array scaffolds may be used for the growth of muscle tissue among other applications. Prior art methods of fabricating these structures are filled with cumbersome, time consuming tasks, often requiring the tedious alignment of small fibers with small spacing. Prior art examples include placing fibers in a comb like structure and then rotating the combs to alter the fiber spacing to the desired separation. This tedious, time-consuming task also makes three-dimensional arrays extremely difficult to fabricate.

Space Separated Array

Space separated arrays contain an array of elements (fibers, posts) that are physical separated from each other. Space separated arrays may also be thought of as short sections of inverse capillary arrays. One or both ends of the array are held in alignment with additional support material. Prior art methods used to fabricate these include physical fiber alignment devices and photolithography among others. In addition to thermoelectric devices, thermophotovoltaic devices, and fiber array scaffolds, space separated arrays can also be used for the following:

BIOASSAYS, DRUG DISCOVERY, AND COMBINATORIAL CHEMISTRY. In these fields it is at times desirable to create a dense, highly ordered array of cylindrical posts having a high aspect ratio at dimensions less than one millimeter. The aspect ratio, or the ratio of a single post's height ("length") to its diameter, is an important parameter for the function of certain devices. Techniques such as photolithography, self-assembly, and solid freeform fabrication have had great difficulty in building post arrays having aspect ratios greater than 10 on a sub-millimeter scale. In such applications, reagents are placed upon each cylinder, or site, and then probed optically or by some other means after a test compound reacts with them. The ability of current manufacturing techniques to produce highly dense arrays of test sites at a very low cost has been elusive.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with an embodiment, a method is provided to fabricate solid linear fiber arrays, multi-hole arrays, and inverse multi-hole arrays (i.e. space-separated arrays). These arrays may be used, for example, as capillary arrays, photonic crystal fiber, tissues engineering scaffolds and templates, imaging guides, nanoarrays, thermal photovoltaic devices, and thermal electric devices. The fabrication methods are quicker, less expensive, and more efficient then prior art methods.

The number of fibers used to fabricate the array structures is variable from less than 20 to greater than 1 billion. A large variety of different thermoplastics and/or resins may be used to manufacture the structures. In addition, the cross section of the fiber is extremely variable, and may be, for example, a rectangle, a square, a circle, or any other suitable shape, including symmetrical or asymmetrical shapes. In addition, the configuration of each of the individual fibers is variable.

In accordance with an embodiment, individual fibers are deposited into a fiber depository and made to bond together. The deposition may be performed in line with fiber production or may be performed after producing the fibers through fiber rewinding. The bonded linear fiber array may be removed from the fiber depositories.

In accordance with another embodiment, the fiber depositories may be bonded to the linear fiber array. This may provide facility handling of the linear fiber arrays or for other functions.

In accordance with another embodiment, the fibers used to fabricate the linear array may be solid fibers.

In accordance with another embodiment, the fibers used to fabricate the linear array may be composite structures formed from more than one material, an example of which are polymer optical fibers which have a core and one or more claddings.

In accordance with another embodiment, the fibers used to fabricate the linear array may be capillary fibers—i.e., fibers with a hole throughout their length.

In accordance with another embodiment, the inner material (core) of a solid fiber may be removed after bonding, thereby forming a capillary array.

In accordance with another embodiment, the outer material (cladding) of the single fiber may be removed after bonding.

In accordance with another embodiment, one or more materials from a composite structure may be removed producing other advanced structures.

In accordance with another embodiment, material replacements may be performed upon the linear array. For example, the outer material (cladding) of the single fiber may be removed after bonding, thereby forming a space-separated array. Then another material may be potted around the space-separated array.

In accordance with another embodiment, the array structures formed by the invention may be used as fabricated or they may be drawn, and fused together to form an array of arrays, repeatedly as desired to fabricated devices. For example, Nanoarrays containing 1.25 billion elements, each less than 100 nm in diameter may be fabricated.

Other advantages will become apparent from the following detailed description when taken in conjunction with the drawings, in which:

BRIEF DESCRIPTION OF THE DRAWINGS

FIG. 2 shows an end-face view of a single fiber element;

FIGS. 5a–c show the construction of a faceplate from a fused image guide perform;

FIG. 7a shows a fiber image guide with individual pixel elements that have become unattached;

FIG. 7b shows a fiber image guide with a protective layer about its outer diameter;

FIG. 8a shows an end view of a fiber preform having three individual fiber elements (each with core and two claddings) fused together about a single EMA perform;

FIG. 8b shows an end view of a preform having four individual fiber elements surrounding a single EMA perform;

FIG. 8c shows a single core, three-cladding preform, wherein the third cladding layer itself consists of EMA;

FIGS. 13a–c shows examples of various capillary arrays with additional material around the array produced by different method than used to produce the embodiment shown in FIG. 12;

FIGS. 14a –f show examples of various photonic crystal fibers that the methods in accordance with embodiments may be implemented to produce;

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

A method in accordance with an embodiment produces many solid linear fiber arrays at once, and eliminates the physical transfer of single fiber from the spool on which it is drawn to the fusing apparatus used to join individual fibers into a solid linear fiber array.

Figure 3:
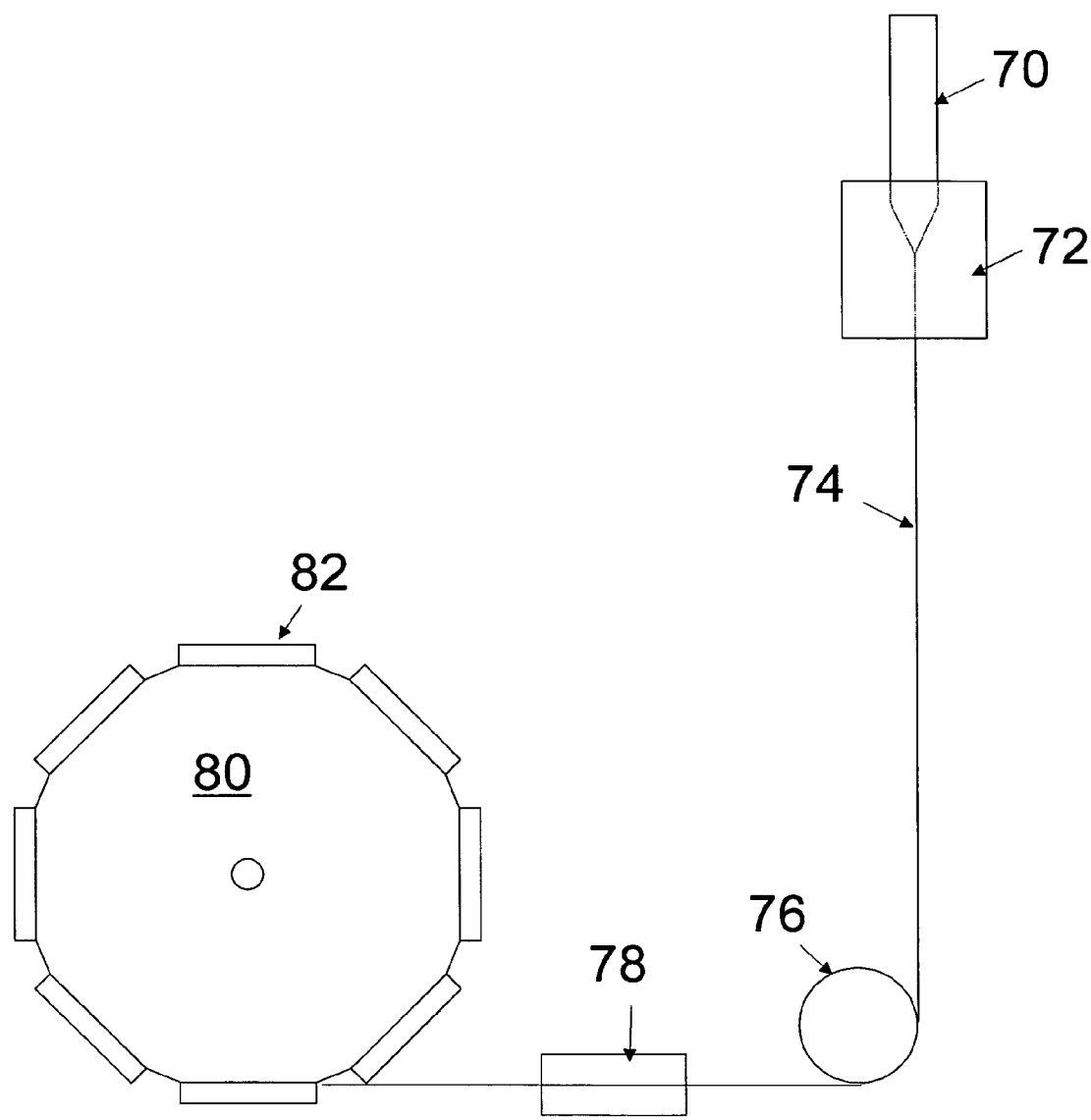
FIG. 3 shows a single fiber being drawn onto fiber depositories.

As can be seen in FIG. 3, a single fiber 74 is drawn using a known process. The single fiber 74 may alternatively be formed by an extrusion facility or produced by other means.

The characteristics of single fiber 74 that is drawn can be quite varied; examples will be discussed later.

In most fiber manufacturing processes, the final fiber is placed on spools as the last step. In accordance with an embodiment, the standard spool is replaced with what is termed herein as a "fiber depository wheel" 80 (e.g., FIG. 3), a "depository wheel," or a "fiber depository spool." The fiber depository wheel 80 onto which the fiber is drawn is fitted with channels, or fiber depositories 82, which may or may not be removed post-draw. In accordance with an embodiment, the fiber depositories 82 may be removed. As further described below, the multiple windings of the fiber 74 that extend through each depository 82 may be fused while remaining in the respective depository, forming a solid fiber array, which is typically linear. This solid linear fiber array may in turn be used as a preform, from which imaging structures may be fabricated, or which may be used in an additional drawing and depository process to form a solid fiber array in which each fiber is an array of fibers. This solid fiber array of fiber arrays may then be used to fabricate an imaging structure, or may be drawn into the depositories to create an even more densely packed solid linear fiber array.

FIG. 3 shows a single fiber 74 being drawn into fiber depositories 82. Also shown in FIG. 3 is a fiber perform 70, an oven 72 and a turning wheel 76. The depository wheel 80 may be constructed of any suitable material, such as various metals, composites, plastics and resins, and/or combinations thereof. The depository wheel 80 may have any radius, from a few centimeters to many meters, depending on the desired details of the solid linear fiber array.

The number of fiber depositories 82 affixed to the depository wheel 80 may range from one to more than 100. In the embodiment shown in FIG. 3, eight (8) fiber depositories 82 are used. In this embodiment, the fiber depositories 82 have a rectangular-shaped cross section; however, the cross section of a fiber depository 82 may be any desired shape such that the resultant solid linear fiber array may be easily removed from the depositories 82 after a fusing step described below (if utilized).

In an embodiment, the depositories 82 are constructed of aluminum. However, they may be made from any other suitable material, such as metals, composites, or thermoplastics and resins. The size of a fiber depository 82 may vary with the parameters of the desired preform. In an embodiment, each fiber depository 82 affixed to the depository wheel 80 is uniform with respect to the others in dimension. As an example, each depository 82 may have a length of eight inches, a width of ¾ inches, and a height of 1.5 inches.

Figure 4A:
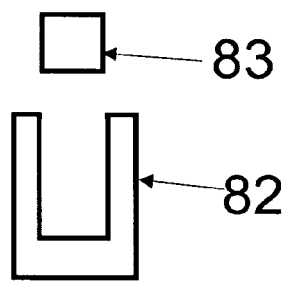
FIGS. 4a and 4b shows exploded side and end views of a fiber depository and fiber depository lid.
Figure 4B:
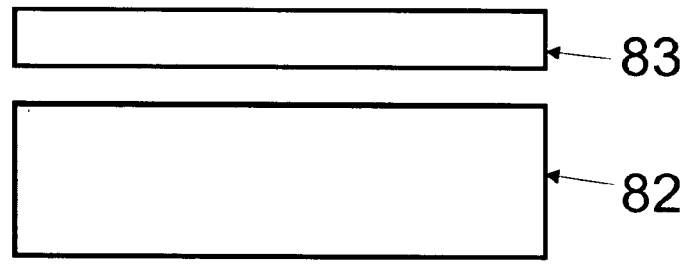

FIGS. 4b and 4a show exploded side and end views, respectively, of a fiber depository 82 and a fiber depository lid 83. In accordance with an embodiment, the fiber depository lids 83 are constructed to have a shape that facilitates easy removal from the fiber depositories 82. In an embodiment, for example to fit the depository example above, each fiber depository lid 83 has a square cross section with dimensions of ¾ inch on each side, and a length of eight inches. The fiber depository lid 83 may be removed from the fiber depository 82 in any direction, depending on the design of the depository wheel 80, fiber depositories 82, and fiber depository lids 83. In an embodiment, the fiber depository lids 83 are inserted into and removed from the top opening of their respective fiber depositories 82.

While not a necessary step, in an embodiment, each fiber depository 82 and fiber depository lid 83 may be coated with a mold release agent such as FREKOTE 770 as manufactured by Loctite. Other mold release coatings or surface preparation agents may be used as well. Alternatively, Teflon sheet may be used to line the inner walls of the fiber depositories 82 and fiber depository lids 83. Such treatment of the depositories aids in the removal of the solid linear fiber array after it has been fused together.

In accordance with a method, a single fiber (e.g., the single fiber 74) is continuously drawn with the fiber depository wheel 80 rotating and the fiber 74 being aligned within the depositories 82. This process continues until the fiber depositories 82 are filled to a desired depth. The amount each depository is filled depends on the desired shape of the final solid linear fiber array. To optimize the packing of the fiber in the fiber depositories 82, the fiber may be translated back and forth across the inner width of the fiber depositories 82 with a fiber translator 78 while being drawn.

In an alternative embodiment, it may be advantageous to separate fiber drawing and fiber wrapping. In this adaptation, fiber is first drawn or otherwise acquired. This fiber may be supplied, for example, on a spool. The fiber on the spool is then wrapped onto the fiber depository wheel 80 into the fiber depositories 82. This alternate embodiment of the method may be best suited to situations of cost efficiency or when using fiber manufactured elsewhere.

After the fiber 74 has been wound into the depositories 82, each depository is fitted with a depository lid 83. If desired, the multiple wrappings of the fiber 74 may be cut on opposite ends of each of the depositories 82 so that the depositories may be processed separately. Also, as described previously, the depositories 82 may be removable from the depository wheel 80.

The multiple wrappings of the fiber 74 within each depository 82 are then fused together to form the solid linear fiber arrays. In an embodiment, the depository lid 83 may be used to impart a compression force upon the fibers as they are fused together. In this embodiment, a clamp or other mechanism is used to compress the fibers within the depository 82 under heat. This fusing process may be performed in a vacuum environment. In an embodiment, a vacuum environment greater than 29 inches Hg is used.

The duration of the fusing process is variable, but generally no longer than 72 hours. Prolonged fusing schedules may induce unwanted changes in the final solid linear fiber array. The temperature used to fuse the fiber together is variable. In one embodiment, the fiber wrappings are fused at a temperature that is greater than the glass transition temperature of each constituent of the fiber 74. In an embodiment, the fibers are fused at temperatures at least as high as 50 degrees centigrade above the glass transition temperature (Tg) of each constituent of the fiber 74 for 24 hours, but not at a temperature higher than any fiber constituent's melting temperature.

In another adaptation, the fibers are composed of materials with widely differing Tg's. In this case, fibers may be fused together at a temperature that is higher than the Tg of some constituents, but not necessarily all. Thus, fusing may occur without deforming the geometry of the material(s) with Tg above the fusing temperature. In one example, Zeonex (higher Tg) is used as the core material and Polymethyl-methacrylate (PMMA) (lower Tg) is used as a cladding material. The fibers are fused at a temperature above the Tg of PMMA but below the Tg of Zeonex. The resulting structure contains Zeonex with the original geometry it possessed when in the single fiber form, encased in PMMA.

In another adaptation, a fiber depository 82 and fiber depository lid 83 are constructed of a thermoplastic that is later fused about the fibers within the depository to become a constituent part of the final solid linear fiber array. In this embodiment, the material used to fabricate fiber depositories may be any thermoplastic or resin that may be suitably fused to the fibers. If the solid linear fiber array (with the additional material that was originally the fiber depository 82 and depository lid 83) is to be drawn in later processing, the material for the depository 82 and lids 83 should also be compatible with fiber draw methods.

Once removed from fiber depository 82, the solid linear fiber array may be further processed to produce various structures, such as the structures described in the background of this document. For example, the solid linear fiber array may be machined to change its cross-sectional geometry. Additionally, the solid linear fiber array (machined or not machined) may be combined with additional materials to be used to manufacture structures that are more complex. These combined structures may then be drawn if desired to reduce the cross-sectional area. Examples of more complex structures include some photonic crystal structures among others, to be mentioned later.

In another embodiment, the solid linear fiber array may be drawn into additional depositories 82, and fused so as to form a solid linear fiber array, with each fiber being a drawn array of fibers, thus resulting in a dense array structure. This process may again be repeated to create an even more dense structure.

There are three main types of single fibers that may be used to fabricate linear fiber arrays, although the invention is not limited to these three. The three types of single fibers are capillary fibers: fibers with one or more holes throughout their length with one or more cladding layers; solid fibers: fibers without holes and that typically consist of a core with one or more cladding layers; and combination fibers: a combination of capillary fibers and solid fibers. The cross-section of single fibers may be of any suitable geometry. The fiber form may vary in diameter, from several nanometers to several millimeters.

Figure 21:
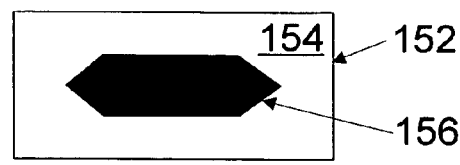
FIG. 21 shows a single fiber example.
Figure 22:
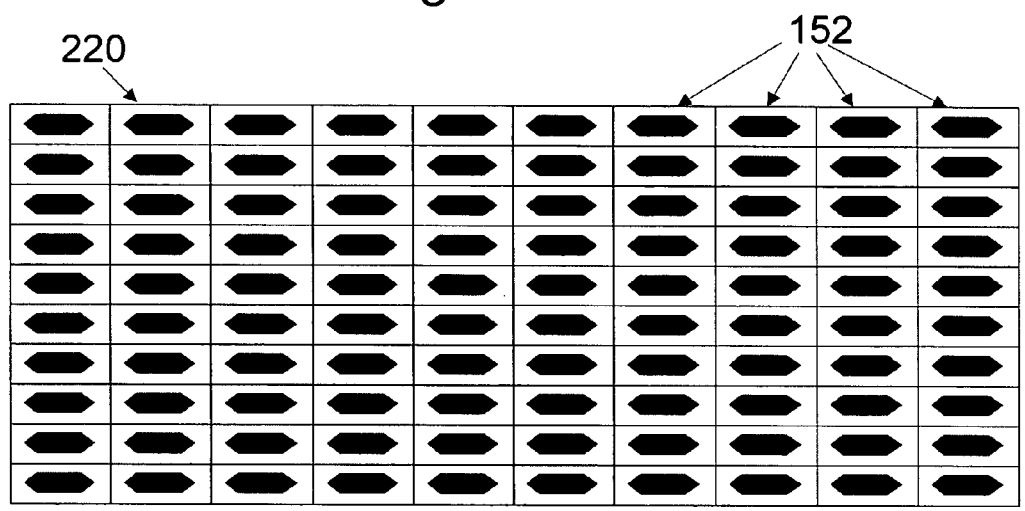
FIG. 22 shows an aligned order fiber array.
Figure 23:
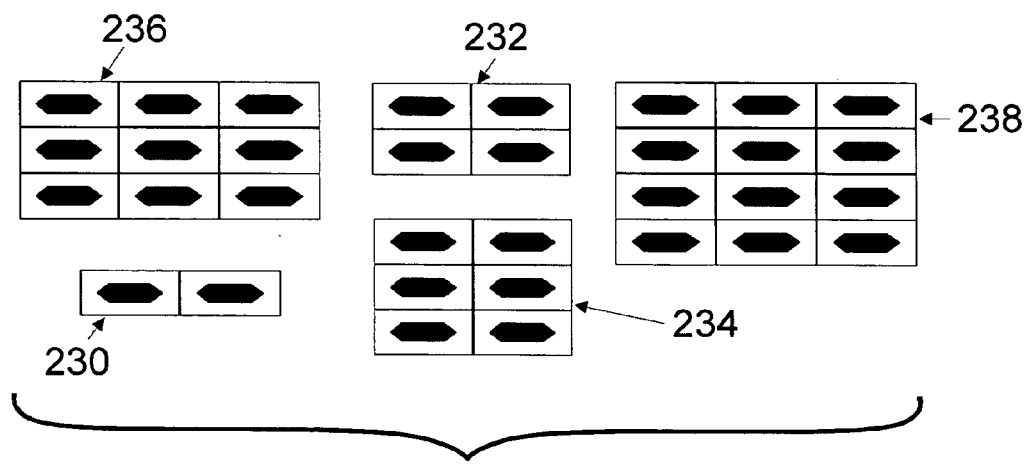
FIG. 23 shows five additional fibers that can be used to construct the structure shown in FIG. 22.

Alignment of single fiber elements may be easily accomplished by using suitably shaped fibers. FIG. 21 shows an example with a single fiber 152 with a rectangular cross-section. In this example, the fiber 152 has a shaped core 156 encased in a cladding 154. This fiber 152 may be used to create an ordered, aligned array 220 as shown in FIG. 22. This array 220 shown in FIG. 22 may be used, for example, to fabricate a tissue-engineering scaffold for use in growing muscle tissue, discussed later. FIG. 23 shows a cross section of five additional fibers 230, 232, 234, 236, and 238 that may be used to fabricate the structure shown in FIG. 22. Each of these additional fibers 230, 232, 234, 236, and 238 includes multiple numbers of the fiber 152 which are connected to form a single fiber that may be used in the drawing and depository process described above. The multiple core fibers 230, 232, 234, 236, and 238 shown in FIG. 22 may be formed, for example, by drawing an appropriate number of wrappings of the fiber 152 into the depositories 82 and fusing the wrapping of the fiber 152 together to form the single fiber. Alternatively, other techniques may be used, such as extruding, for example.

EXAMPLES OF DIFFERENT SINGLE FIBERS USED TO CONSTRUCT LINEAR FIBER ARRAYS

Example 1

Imaging Structures

Figure 1:
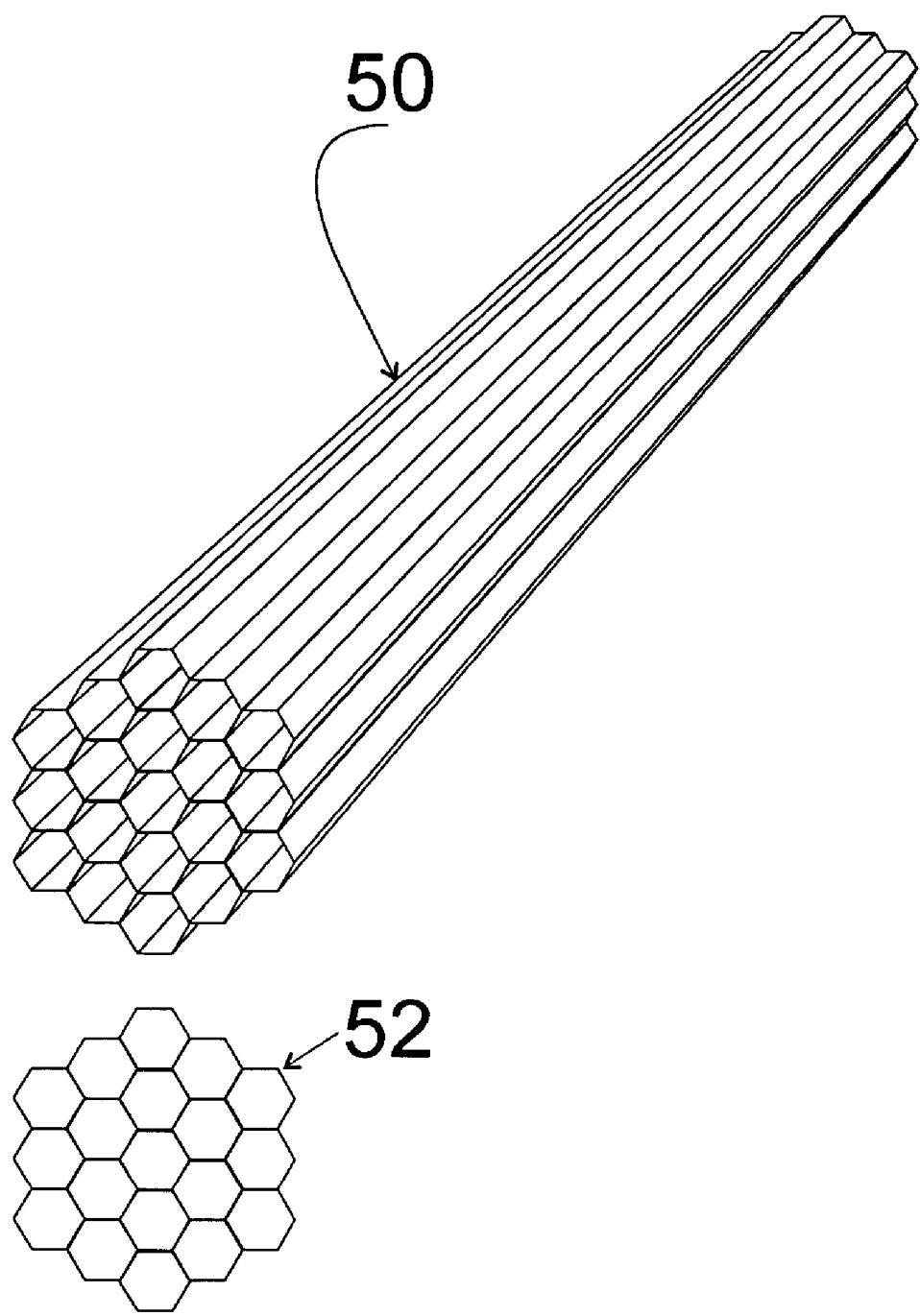
FIG. 1 shows individual fibers being fused to form an image guide perform.
Figure 2B:
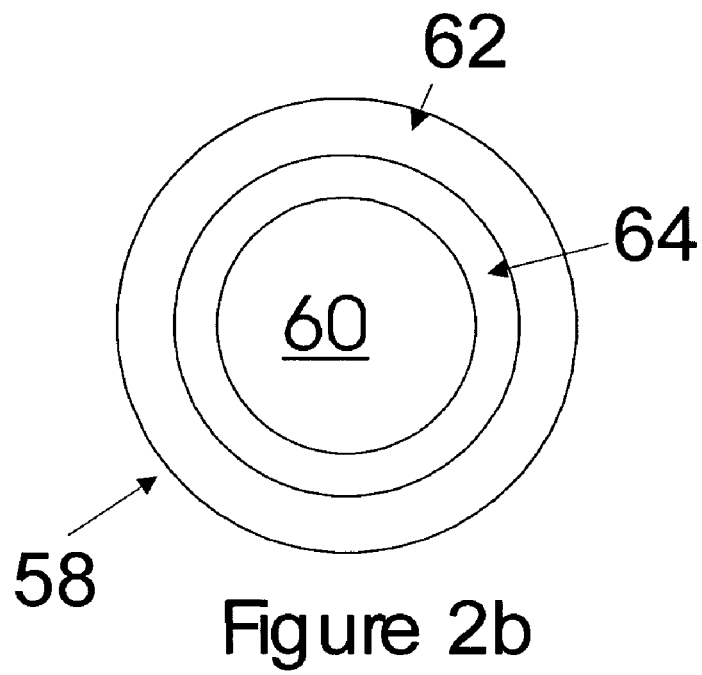
FIG. 2b shows an end-face view of a single fiber element.
Figure 2A:
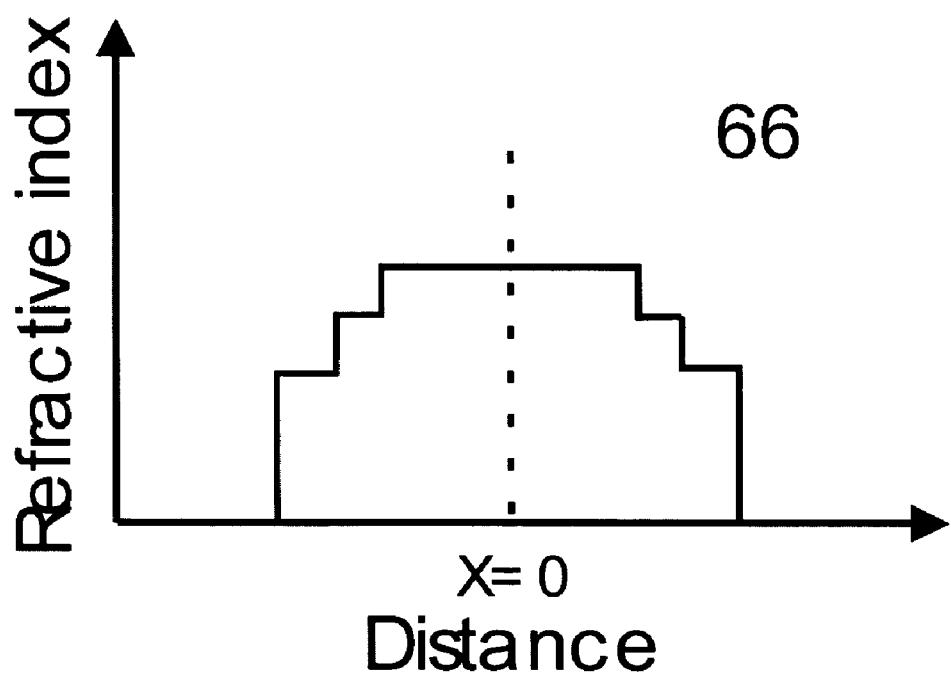
FIG. 2a is a graph showing the refractive index for the fiber element of FIG. 2, plotted as a function of distance from the center of the fiber element.

If a solid linear fiber array is used to fabricate an image guide preform, the fibers used to form the solid linear fiber array are designed and/or chosen accordingly. Multiple core or single core fibers may be used. Single core fiber used to form an image guide preform may have one or more claddings, depending on the optical requirements for an application. In an embodiment shown in FIG. 2a, a single core fiber 58 has two cladding layers 62, 64. The core material 60 has a higher refractive index than at least the first, outer cladding 62. FIG. 2a shows an end-face view of the single fiber element 58, which may be drawn into the depositories 82 for image guide preform fabrication. FIG. 2b shows the refractive index plotted as a function of distance from the center of the fiber element. The refractive indices of subsequent cladding layers 64, 62 may be chosen depending on the desired optical performance of the final image guide.

The fiber 74 that is drawn into the fiber depositories 82 may have an outer diameter in the range from under 1 um to over 2 mm. In an embodiment, the outer diameter of the single core fiber is within the range of 50 um to 1 mm. The diameter of the core in this embodiment is at least 1 percent of the outer diameter of the fiber. The core and cladding(s) may consist of any material that is suitable for the desired performance of the image guide. Examples include, but are not limited to, silica, acrylics, polystyrene, polysulfones, cyclic olefin polymers and copolymers, fluorinated acrylates and various fluoropolymers such as THV (a terpolymer of tetrafluoroethylene, hexafluoropropylene and vinylidene fluoride), FEP (fluorinated ethylene-propylene), PTFE (polytetrafluoroethylene), and polycarbonates. Single fibers used to make the image guides may be step index type with a single cladding, multi-step indexes, two or more cladding layers, graded index or hybrid approach using a graded index core with one or more claddings. For the embodiment shown in FIG. 2, the core material 60 may be optical grade polystyrene (PS), with the first cladding 64 made of acrylic (PMMA), and the second cladding material 62 made of THV fluoropolymer.

A fused image guide preform 84 (FIG. 5a) formed using the depository/fusing process described above may be formed into an image guide, for example by drawing the fused image guide preform 84 into a fiber image guide using a known fiber draw apparatus. Alternatively, fused image guide preforms 84 may also be used to construct image faceplates 88 (FIG. 5c). An example faceplate 88 may be ¾ inch in width and height, and ½ inch long, although faceplates may be formed of many different sizes. Faceplates 88 may be constructed by cutting slices of a fused image fiber preform 84 and polishing both sides of the slice. A fused image guide preform 84 is cut into thin sections, leaving the remaining image guide preform 86 (FIG. 5b) and faceplates 88 (FIG. 5c).

Figure 6A:
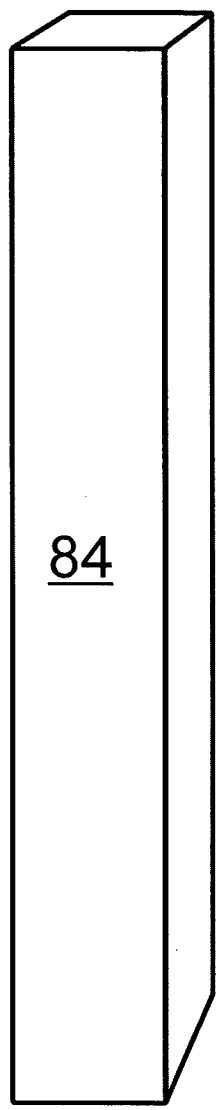
FIGS. 6a–c show the construction of a taper from a fused image guide perform.
Figure 6B:
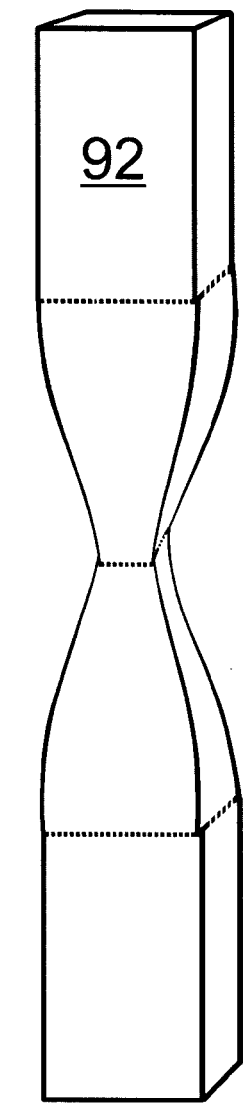
Figure 6C:
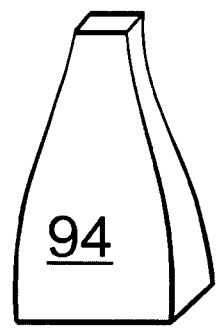

In addition, a fused image guide preform 84 may be used to form a taper 94 (FIG. 6c). A taper 94 may be constructed by drawing down only a section of an image fiber preform 84 such that the resultant product has a shape similar to a truncated cone, with a large diameter on one side and a smaller diameter on the other. FIGS. 6a–c show the construction of a taper from a fused image guide preform 84. FIG. 6b shows an elongated image guide preform 92 after a draw step but before a cutting step. The dashed lines represent areas to be cut, forming two tapers 94. In addition, a fused image guide preform 84 may be machined (or otherwise formed or shaped) to have a cross section other than a rectangle or square.

In another optional step, it may be beneficial to introduce an outer material layer 98 (FIG. 7b) to the image fiber, taper, or faceplate. For example, FIG. 7b shows a fused fiber image preform 84 with a protective layer 98 about its outer diameter.

Adding the protective layer 98 to the fused fiber image preform 84 may be accomplished by using methods such as extrusion, coating, vacuum fusing, or as described previously, by using fiber depositories as the protective layer. An outer protective layer 98 may be added to a fused image guide preform 84 prior to draw (as an additional element to the image guide preform), during drawing of an image guide (via established cable coating methods such as extrusion or using a vacuum draw), or post-draw, as a finishing step (via established methods such as coating). Adding a protective layer serves to: 1) protect the image fiber from abrasions or substances that may peel pixel fiber elements from the fiber whole or damage it in some other way, and 2) facilitate the polishing process. In the latter case, the reasoning is as follows. When polishing the fiber using an abrasive method, fiber pixel elements of the image guide may become disconnected from the image guide fiber whole. For example, FIG. 7a shows a fiber image guide 96 with individual pixel elements that have become unattached. The use of outer protective layer 98 prevents this from occurring.

The image guide is finished and prepared for use by polishing both ends as known in the prior art. Such polishing may be accomplished using established methods such as abrasion, hot knife, microtome cut, etc. In an embodiment, a microtome blade is used to prepare the surfaces of an image guide.

Extra Material Absorption (EMA)

In an optional embodiment, extra material absorption (EMA) elements 106 (FIGS. 8a–c) may be added to a fused image guide preform 84. EMA is added to absorb stray light traveling in the cladding of single fibers that may refract into an adjacent fibers' core. Such refraction has the effect of blurring or distorting the image on the distal end of an image guide. Adding EMA using the methodology for linear fiber array fabrication as described above may be accomplished by drawing one or more single-core fibers having EMA together onto fiber depositories in a single step.

Figure 8A:
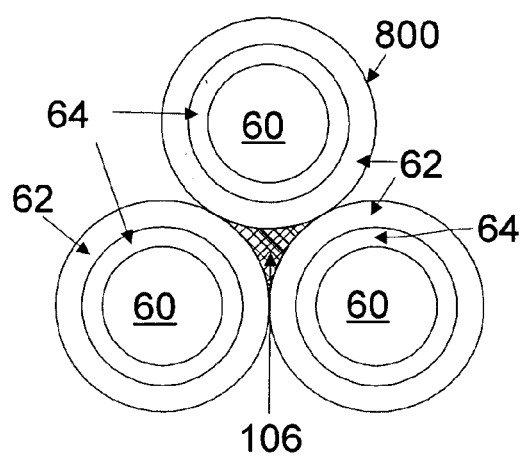
FIG. 8a–c shows cross sections of various fiber preforms having Extra Material Absorption (EMA) constituents that may be used to draw fiber into fiber depositories.
Figure 8B:
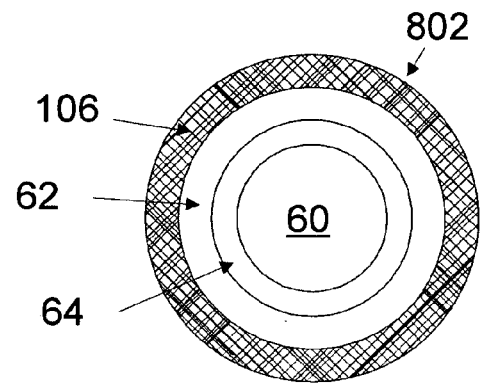
Figure 8C:
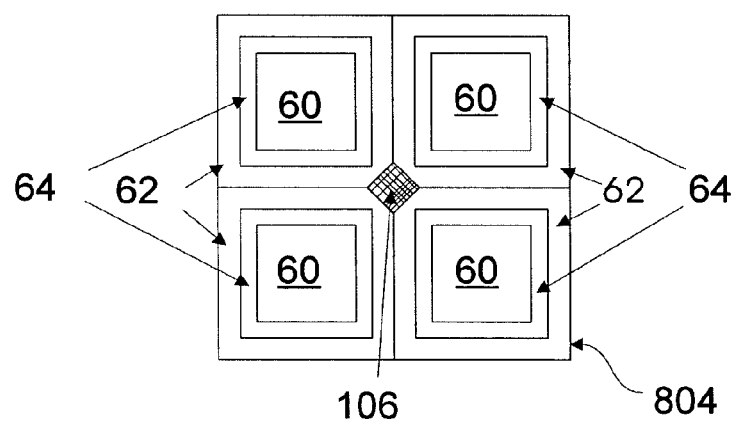
Figures 9A, 9B, 9C:
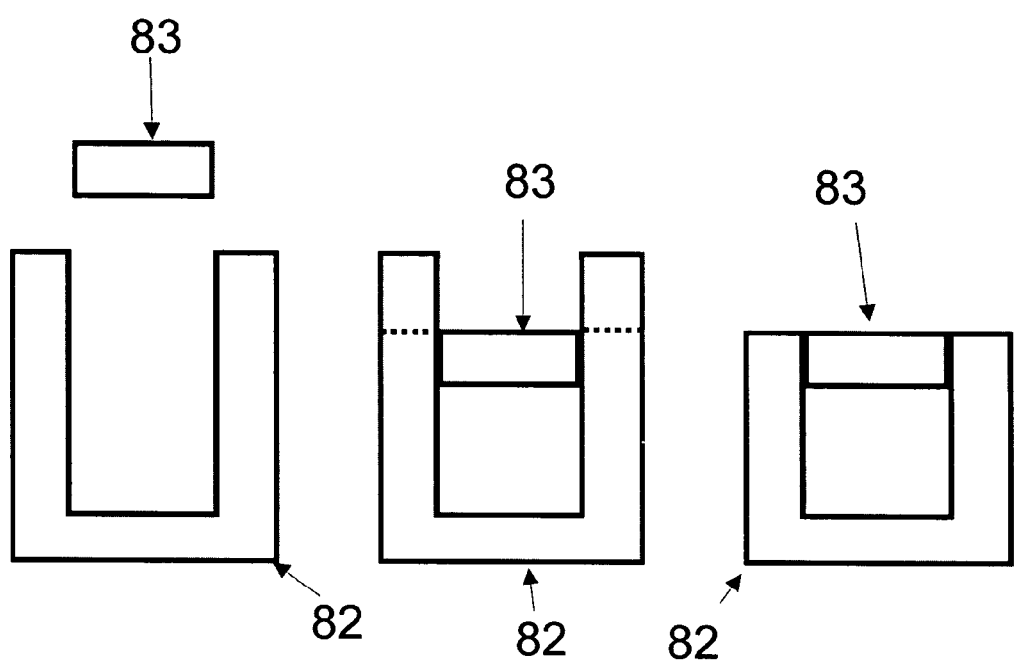
FIGS. 9a–c show exploded end face views of a fiber depository and depository lid shaped for use as a protective cladding layer.

Single fiber preforms may have any number and/or combination of EMA and single core fiber preform elements. FIGS. 8a–c show cross sections of various fiber preforms having EMA constituents 106 that may be used to draw fiber into fiber depositories. FIG. 8a shows an end view of a fiber preform 800 having three individual fiber elements (each with core 60 and two claddings labeled 62 and 64) fused together about a single EMA preform 106. FIG. 8c shows an end view of a fiber preform 804 having four individual fiber elements surrounding a single EMA preform. FIG. 8b shows a single core, three-cladding preform 802, wherein a third cladding layer is EMA 106.

A single fiber preform having EMA preform and single core fiber preform constituents is constructed by fusing such constituent parts together under elevated temperature. Any temperature that fuses the primary preform's constituent parts may be used. In an embodiment, the fusing temperature for a single fiber preform's construction is chosen to be at least ten degrees centigrade above the highest glass transition temperature of the materials used to construct a single fiber preform.

In all cases represented by FIGS. 8a–8c, the preform 800, 802, or 804 is drawn under heat and tension to lie in fiber depositories 82 and then is subsequently processed into the fused image fiber preform 84. The fused image fiber preform 84 may then be formed into an imaging structure, or may be drawn to reduce cross section.

Example 2

Multi-Hole Arrays

There are at least two types of fibers that may be used to produce multi-hole arrays: solid fibers and capillary fibers. Solid fiber requires further processing after fusing to produce multi-hole arrays, while capillary fiber may not need additional processing after fusing to produce multi-hole arrays, although they may be further processed for other reasons, to be explained later.

Figure 10A:
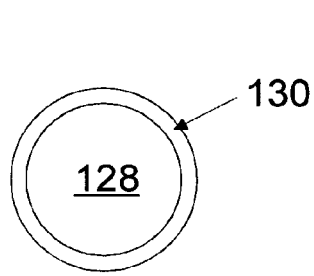
FIGS. 10a–e show examples of various capillary fibers.
Figure 10B:
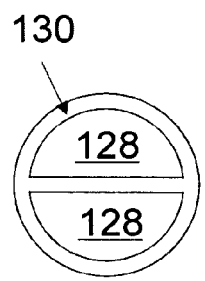
Figure 10C:
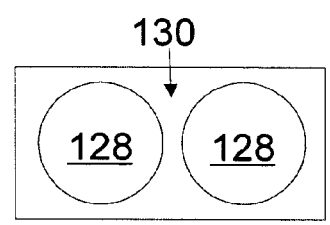
Figure 10D:
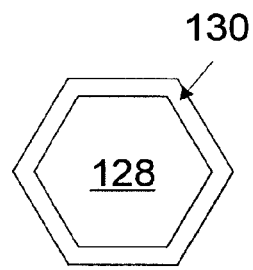
Figure 10E:
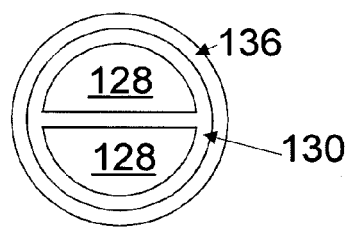
Figure 11A:
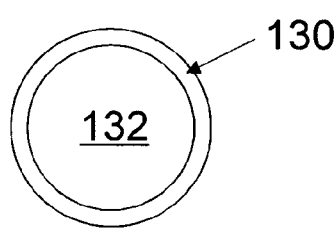
FIGS. 11a–e show examples of various solid fibers.
Figure 11B:
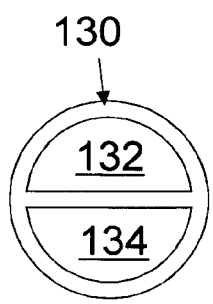
Figure 11C:
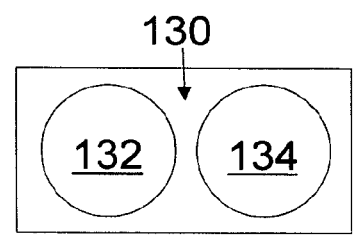
Figure 11D:
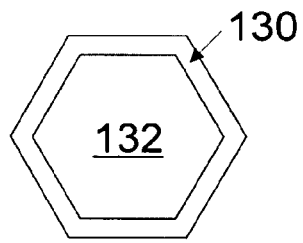
Figure 11E:
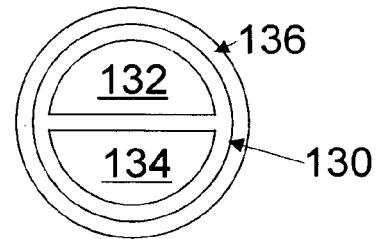

Capillary fibers (fibers with hole(s) throughout their length) are placed in the fiber depositories in the same manner as solid fibers. Fusing conditions will vary; too much pressure will cause the pores of capillary fibers to collapse, and too little pressure will result in poorly bonded capillary fibers. Exact pressures, temperatures, and timing of fusing cycles used depend upon the geometry of the fibers and their material composition. FIG. 10 shows various capillary fiber examples. FIG. 10a shows single hole 128 surrounded by cladding material 130. FIG. 10b shows two holes 128 surrounded by cladding 130. FIG. 10c again shows two holes 128 surrounded by a cladding 130, but in an alternative geometry. FIG. 10d shows a single hole 128 surrounded by a cladding material 130. FIG. 10a shows two holes 128 surrounded by a cladding material 130 and an additional cladding material 136.

The solid fibers chosen to fabricate multi-hole arrays are chosen such that one component of the fiber may be dissolved away leaving the other unaffected. If desired, very small holes may be produced by performing multiple draw/depository/fusing processes on a set of solid fibers, so the cores get smaller in cross-section in each successive draw. The cores are then etched away. A single core fiber used to produce such multi-hole arrays may have one or more claddings. In many embodiments, the single fibers may be approximately the same size. In some embodiments, this is not desirable, and it may be desired to have the size of single fibers change as they are laid into the depository. For example, a multi-hole array may be created that has larger holes in the middle than on the top and bottom. This may be accomplished by altering the draw parameters of the drawing process.

FIG. 11 shows various solid fiber examples. FIG. 11a shows a single core 132 surrounded by a cladding material 130. FIG. 11b shows two cores 132 and 134 (each core material may be different if desired) surrounded by a cladding 130. FIG. 11c again shows two cores 132 and 134 surrounded by a cladding 130, but in an alternative geometry. FIG. 11d shows a single core 132 surrounded by a cladding material 130.

In an alterative embodiment, combination fiber may be used, i.e. fiber with both solid cores and holes. An example of such a fiber would be such as the one shown in FIG. 11b, 11c or 11d, wherein either element 132 or 134 are holes and the other remaining element in the figure is a solid core.

Capillary Structures

One example of a multi-hole array is a capillary structure. A method of creating a capillary structure 140 (FIGS. 12a and 12b) is to use capillary fibers or to choose the core material of solid fibers such that the core material may be dissolved or chemically etched by a solvent that does not affect the cladding material(s) of the solid fibers. This dissolving may be performed prior to the draw, or post-draw. Capillary arrays 140 may also be constructed using chemically resistant materials.

When fabricating capillary structures from fused linear fiber arrays, a solid linear fiber array with or without core material present may be drawn to reduce its overall dimensions. In some cases (those in which the capillary length is long enough to inhibit efficient removal of the core material after drawing), the core material is removed (if present) prior to drawing it. The drawn array may then be encased in an additional cladding material 98 and redrawn if it is desired to further reduce the dimensions of the capillary array 140. This additional cladding material 98 may be removed after drawing if desired. If this is desired, in accordance with an embodiment, the added cladding 98 is chosen such that it can be removed through dissolving, mechanical peeling, or melting.

A draw process may not be necessary for forming a capillary structure, depending on the final desired capillary structure. For example, a solid linear fiber array may be placed in an appropriate solvent thereby removing the core material (if present), leaving an array of holes or pores through the length of the material.

The solid linear array may be processed prior to dissolving core material (if present). For example, the solid linear array may be machined or otherwise shaped into another geometrical shape, such as round or otherwise. Additionally, a capillary structure may have its length shortened, as would be required to fabricate a capillary faceplate. Regardless and in most cases, in accordance with an embodiment, the final structure has flat and smooth ends: this may be performed before or after dissolving core material (if present). There may be cases where a shaped end may be alternatively be used; the ends may be machined into the desired shape before or after removing the core material (if present). In accordance with an embodiment, shaping or flattening the end would be performed prior to dissolving the core material. If present, this may ease the shaping or flattening process employed. The structure may be further processed to produce other structures such as photonic crystal structures (see below).

Figure 12A:
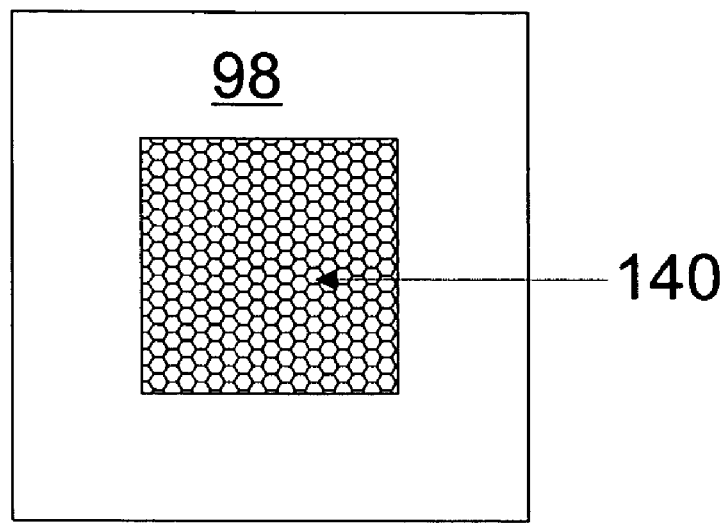
FIGS. 12a–b show examples of various capillary arrays with additional material around the array produced by one method.
Figure 12B:
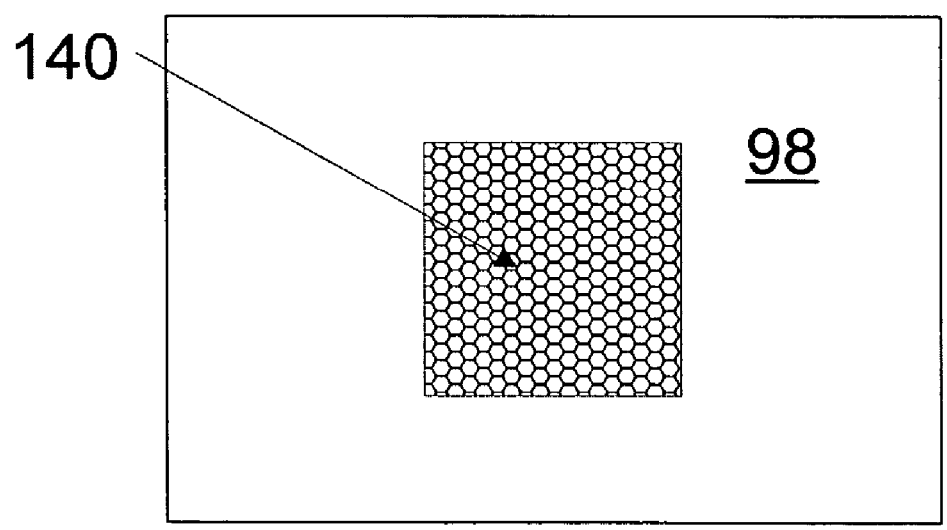

In some cases, it is desirable to encase the capillary array 140 in material 98 to ease handling. This may be accomplished in an embodiment by an appropriate choice of fiber depository 82 materials and geometry. If a solid fiber is used, in accordance with an embodiment, the material from which fiber depositories 82 are constructed is also resistant to the solvent that will be used to dissolve the unwanted material if present. Two examples are shown in FIGS. 12a and 12b that show a capillary array 140 encased in an additional material 98.

If additional material 98 is compatible with prior art drawing methods, it may be drawn to reduce its dimensions. If solid fibers are used to fabricate capillary structures, unwanted material may be removed either prior to or after addition of additional material 98, and/or either prior to or after drawing of the structure.

In another capillary structure embodiment, additional material 98 is added after a fusing step. In this embodiment, a linear fiber array may be machined or otherwise shaped prior to the addition of additional material. As a further option, multiple, additional arrays or structures may also be embedded in the additional material.

If additional material 98 is added after fusing, the additional material 98 may be fused to a linear array (shaped or not), or it may be bonded to a linear array by other means such as potting, use of a suitable bonding agent, polymerization, or by other suitable means. A few examples are shown in FIGS. 13a, 13b, and 13c. FIG. 13a shows four capillary arrays 140 encased in additional material 98. FIG. 13b shows a single capillary array 140 encased in additional material 98. FIG. 13c shows five capillary arrays 140 encased in additional material 98 with another arbitrary (user defined) element 142. This arbitrary element 142 may be a hole, light guide, a gear hole, or other element as desired by the end user.

If a tapered capillary array is desired, a taper may be constructed by drawing down only a section of an solid linear fiber array with or without core material present, such that the resultant product has a shape similar to a truncated cone, with a large diameter on one end and a smaller diameter on the other. The procedure used is similar to that used when fabricating imaging guide tapers.

It is important to note that capillary array(s) may be produced using material that is very chemically resistant, as may be important for biochemical analysis, which often requires the use of solvents. Examples of such materials are the various grades of Radel, a polysulfone.

Example 3

Photonic Crystal Structures

Photonic crystal structures are essentially fiber arrays that have intentionally placed defect(s) in a linear array of single fibers.

In one embodiment, fibers used to fabricate photonic crystal structures are chosen such that one component of a fiber may be dissolved away, leaving other parts of the same fiber unaffected.

In an alternative embodiment, material is not dissolved away. The type of single core fiber used may have one or more claddings.

In another embodiment, fibers chosen to fabricate photonic crystal structures are chosen such that materials have different indices of refraction. It is generally desirable that the refractive index difference is large (e.g., greater than 0.1).

In another embodiment, capillary fibers are used to fabricate photonic crystal structures.

It is generally desirable that any material that remains in a final photonic crystal structure exhibit low optical attenuation at those wavelengths of light at which the device operates. In addition and in general, it is often a requirement that a photonic crystal structure is drawn, encased in some material, and redrawn to obtain some final desired dimensions, unless the starting dimensions of the array are large enough to satisfy the final device size requirements in a single draw. This process may be repeated.

Photonic Crystal Fiber

Photonic crystal fiber is in general a multi-hole array that has (in general) a centrally located defect 144 (FIGS. 14a–f). Utilizing the depositories method described above, a photonic crystal fiber may be fabricated by placing a differing fiber or fibers (termed defect fiber(s) 144) in approximately the center of an array during the layering or placement of fibers, and prior to the fusing step. In general, it is desirable that defect fiber(s) 144 are located in precisely the center of an array. If the initial placement of fiber defects in a fiber array is not in its exact center it may be necessary to machine or shape the linear fiber array after fusing such that the positions of defect fiber(s) 144 are located at the array's center.

The shape of the defect fiber(s') cross section is variable depending on the final properties desired from a photonic crystal fiber. There are many examples in the prior art. Some examples of the final desired defect shape include a hole, a hole surrounded by a cladding, and a solid. Defect fiber(s) 144 used to form a hole defect may be made, for example, from a material that would be dissolved during the same step that dissolves the core material (if present). Defect fiber(s) 144 that are used to produce tube defects are, for example, either single core fiber(s) with one or more cladding layers, or capillary fiber(s). Defect fiber(s) 144 are similar to fibers that are used to fill the depositories, with the exception that they differ in one or more of the following aspects: material composition, overall diameter, cladding thickness, and/or core diameter. The material from which defect fiber(s) 144 are made may vary, but in accordance with an embodiment, they are made from the same materials as other fibers of the array in which they are used. An alterative embodiment that may be used to produce a solid defect may be used instead of the method presented here (a description of this alternate embodiment appears below). If core materials are present, defect fiber(s) 144 used to produce solid defects are formed, for example, from a material that is not adversely affected by the solvent used to dissolve the core material(s) of other fibers in the array.

Defect fiber(s) 144 may be placed in an array using various different methods, the easiest of which is to employ a defect fiber(s) 144 of proper size and type manufactured by methods know in the prior art. When layering has preceded to sufficient height (generally halfway through the structure) the defect fiber(s) 144 is placed in the center; the layering is then allowed to proceed to completion of an array. A linear fiber array is then fused. A fused linear fiber array (which may be encased in additional material if desired) is generally redrawn to reduce its dimensions. FIGS. 14a–f shows various photonic crystal fibers with defects 144.

An alterative method embodiment for producing photonic crystal fiber with a solid defect is presented here, and this method may be used instead of the method presented above. In this method, no defect fiber(s) are placed in the linear array. The linear fiber array is produce without a defect fiber. The cores of the fibers in a solid linear fiber array are removed through dissolving if they are present. This structure is similar to the capillary array described previously that did not undergo a draw process after fusing of a linear fiber array.

The next steps in the fabrication are as follows. First, a solution of material is prepared. This solution may be a monomer solution (as known in the prior art), polymer-monomer slurry, a resin, or any other material that when placed into a hole(s) in the linear fiber array (with cores removed, if present) may be made to form a solid. Such a "solution material" in one embodiment is compatible with a draw process, and the material that it will be in contact with in the array. This solution material may be, for example, a viscous substance, which eases the insertion of a material into chosen hole(s) in the array. Solution material is, in one embodiment, a monomer solution. Solution material is then placed into a hole in the array in a desired location(s), which is generally in or near the center of an array. Placing solution material into holes is readily accomplished using a syringe having a needle of diameter smaller than holes at desired location(s). If desired, a vacuum environment may be applied to the opposite end of the array to aid this process.

Any vacuum will suffice, but a high vacuum, such as greater than 29 inches Hg, is used in accordance with one embodiment. Alternatively, a long needle may be inserted completely through the array, and the needle is subsequently pulled out of the hole as the material is placed in the hole via the syringe. Solution material placed into a hole is then made to form a solid material (if desired). This array with a defect may then be drawn into photonic crystal fiber (and encased and redrawn if necessary). A few examples are shown in FIGS. 14a–f.

Photonic Crystal Circuits

Figure 15:
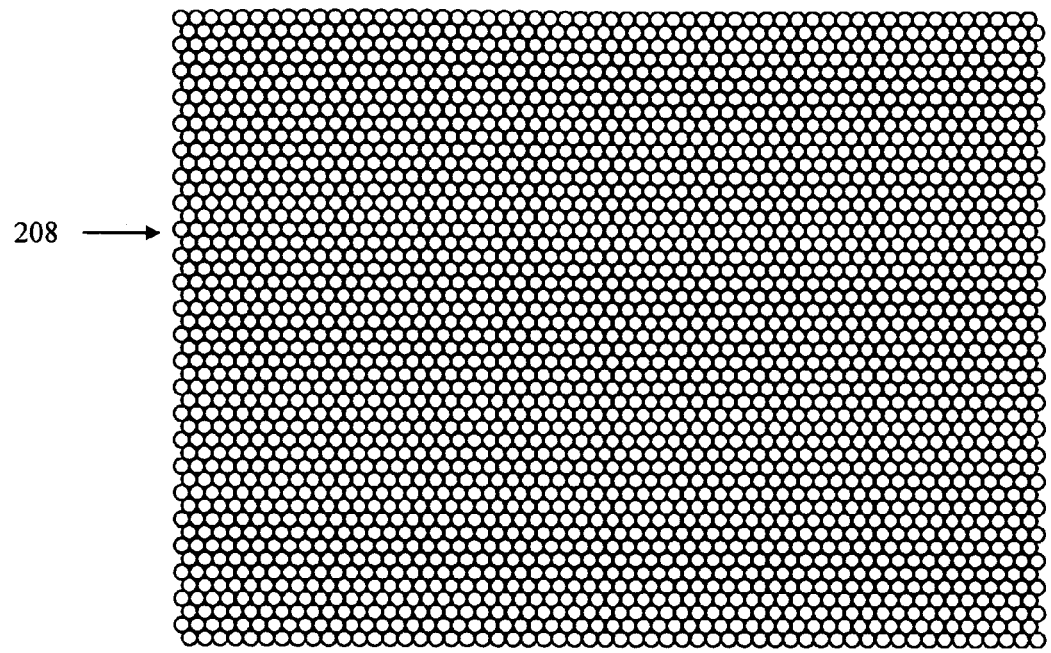
FIG. 15 shows an example of a cross-section of a capillary array.
Figure 16:
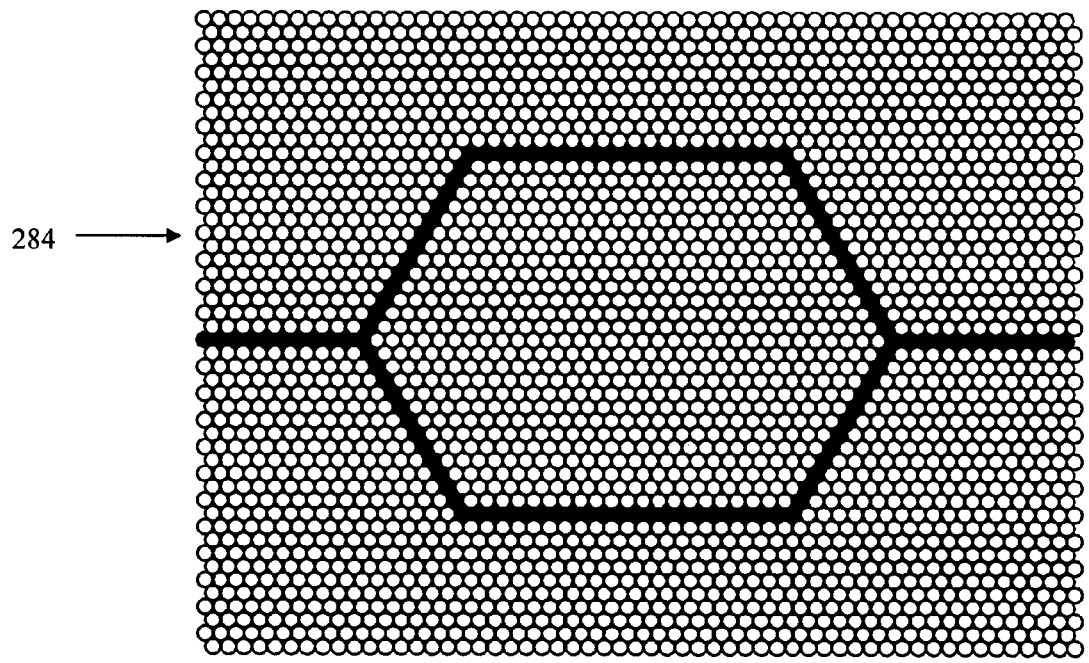
FIG. 16 shows an example of a photonic crystal Mach-Zender interferometer.
Figure 17:
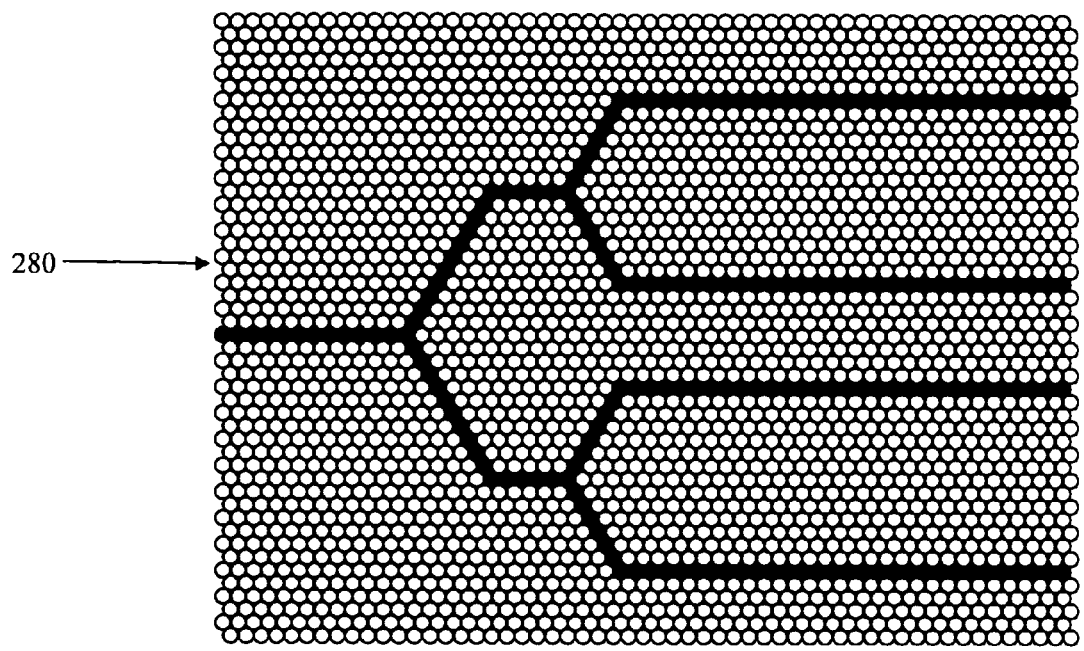
FIG. 17 shows an example of a photonic crystal splitter/combiner.
Figure 18:
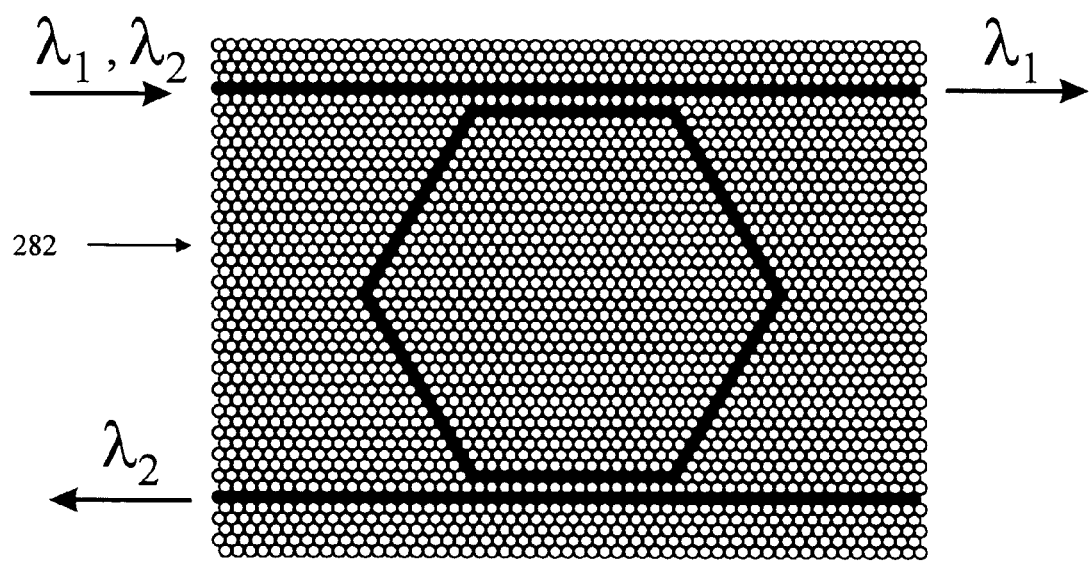
FIG. 18 shows an example of a photonic crystal "race track" de-multiplexer.
Figure 19:
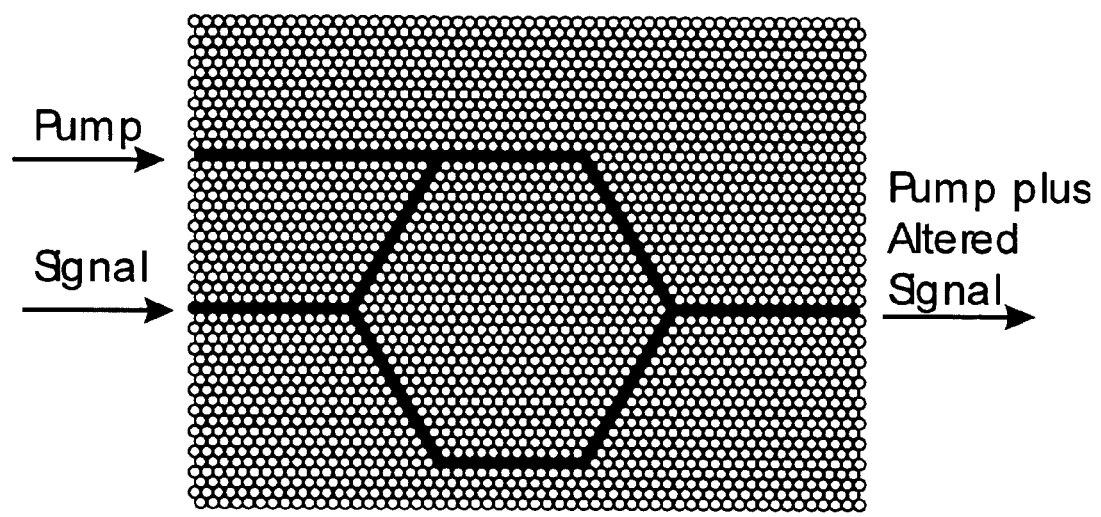
FIG. 19 shows an example of a photonic crystal all-optical modulator.

In this embodiment, no defect fiber(s) are placed in the solid linear array. The solid linear fiber array is produced without a defect fiber. If present, cores of fibers in the solid linear fiber array are removed through dissolving. The cross-section of a resultant structure 208 is shown in FIG. 15. The structure 208 shown in FIG. 15 is similar to the capillary array described previously that did not undergo a draw process after fusing of a solid linear fiber arrays. Solid defects are then introduced utilizing the procedure above for photonic crystal fiber; however, more defects are introduced. In accordance with an embodiment, remaining holes are filled with another solution material and made to solidify. This solidified solution material aids in producing and maintaining a proper photonic crystal geometry cross section during the draw process, and aids in polishing and finishing. Solution material may be removed post-draw, or it may be left in the device, depending on final design parameters.

Figure 20A:
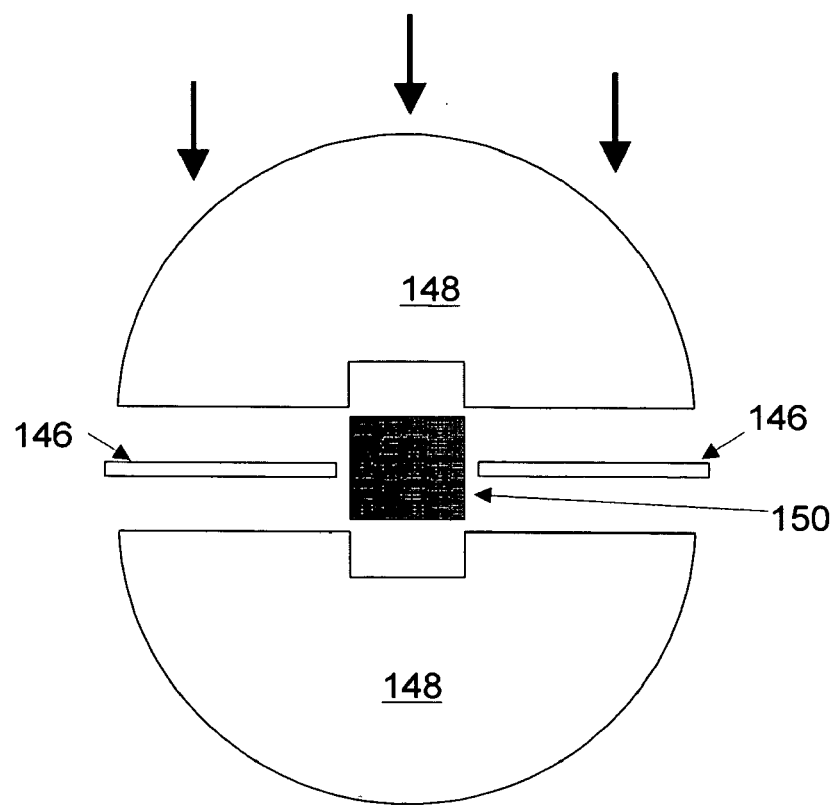
FIGS. 20a –b show encasement of a photonic crystal circuit preform in additional material.
Figure 20B:
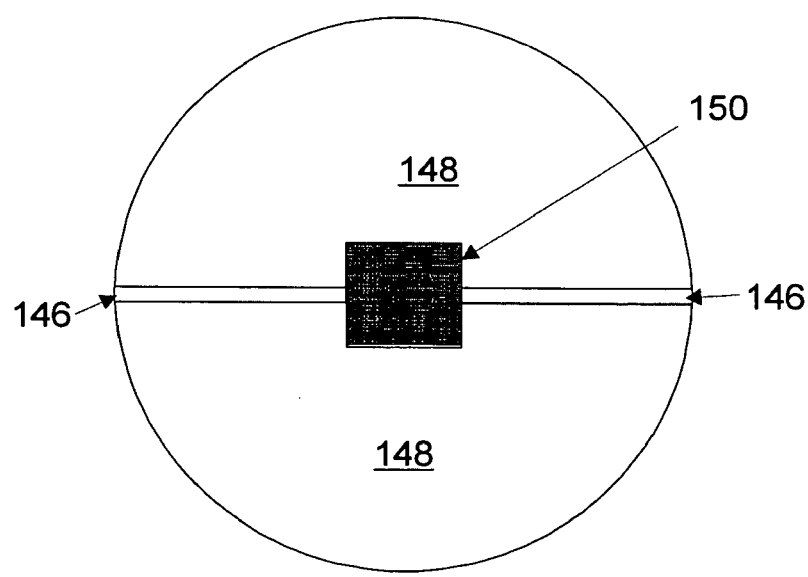

An array with defects may then be drawn to desired dimensions in a draw tower. It may be necessary to then take a section of the drawn array, encase it in an additional material 148 and 146 (FIGS. 20a and 20b), and then draw it again to obtain desired dimensions. The process is shown diagrammatically in FIGS. 20a and 20b. FIG. 20a shows parts of a photonic crystal circuit prior to bonding. FIG. 20b shows a structure after bonding. Cladding materials 148 and 146 and photonic crystal structure 150 are bonded, for example using heat and pressure as described previously. This particular embodiment contains material 146 that may be removed, for example through dissolving. The remaining void may serve to guide and/or aid placement of supply and output optical fibers. After desired dimensions have been obtained, photonic crystal circuit array (now in fiber form) is sliced into thin sections (in an embodiment less than 5 mm, and in another embodiment less than 1 millimeter) and polished (by known methods) on one side (e.g., 1 micron or better finish). The polished side of the section is then bonded to a bottom substrate. Bonding may be performed using various methods, including chemical bonding, pressure bonding, heat bonding, or other bonding processes known in the prior art.

In accordance with an embodiment, polymer materials are used as a substrate and are bonded using heat and slight pressure. A bottom substrate is desirably polished to a finish of 1 micron or better. A bottom substrate may be constructed using a variety of materials as known in the prior art. Example prior art materials include silicon, glass, and polymer. An array with a bonded substrate may be polished (with a finish 1 micron or better) to desired dimensions. In accordance with an embodiment, a height dimension has a value of less than 65 microns. After polishing, a photonic crystal circuit is immersed in a solvent to remove unwanted material from it. After unwanted material is removed, a top-layer substrate is attached in the same manner as a bottom substrate, to sandwich a photonic crystal circuit between them.

Many photonic crystal structures are known in the prior art. Many of them may be fabricated utilizing the present embodiment. By way of example, a few are presented here. The specific devices are not subjects of the present invention and as such, their operation is not discussed in detail. FIGS. 16–19 serve to illustrate some of the structures that may be fabricated utilizing the methods described herein. Such structures are known, but a brief description is given here for the benefit of the reader.

Example 1. Photonic crystal splitter/combiner 280. In this example, shown in FIG. 17, a single light beam may be split into four parts. In reverse, four light beams may be combined together into one light beam Example 2. Photonic crystal "race track" de-multiplexer 282. Shown in FIG. 18, a single light beam of two frequencies is incident upon the structure. One light beam of a given frequency exits one channel and second light beam of a frequency different than the first exits from a second channel.

Example 3. Photonic crystal Mach-Zender interferometer 284. Shown in FIG. 16, an incoming light beam is split into two light beams, and recombined. The materials that form the two arms of the interferometer may be different so that electro-optic or other effects may be used to influence the recombinant properties of the beams.

Example 4. Photonic crystal all-optical modulator 286. Shown in FIG. 19, this device uses a pump beam to alter the recombinant characteristic of signal beam.

Example 4

Tissue Engineering Structures

Paralled Channel Templates and Scaffolds

Parallel Channel Scaffolds (PCS) are structures that have an array of pores or holes that are not interconnected in their final form. Parallel Channel Scaffold Templates (PCST) are use to produce Parallel Channel Scaffolds. There are at least four methods that may be employed to produce embodiments of PCS and PCST. Each of these methods imposes their own requirements on the material composition of single fibers used to fabricate PCS and PCST. In many cases, it is desirable that scaffolds be composed of biodegradable materials that do not interfere with natural body functions. For example, it is desirable that a biodegradable material does elicit an immunological response when placed in the body. It may also be desirable to use a material that does not inhibit, or at least does not hasten, scar formation. There are many other requirements and desirable properties associated with PCS and PCST biodegradable materials, such as inclusion of growth factors, strengthening elements, and other chemical constituents. The final composition of tissue scaffolding is not a subject of the present invention. Rather, a methodology is presented here that may be employed to fabricate tissue scaffolds regardless of their final composition.

The most straightforward fabrication path for PCS or PCST that uses the present method is to employ capillary fiber made from a biodegradable polymer. Capillary fibers are arranged and a structure is then fused; the resulting structure is a parallel channel scaffold. A scaffold may be machined or shaped prior to use if desired. The scaffold may also be drawn to reduce its dimensions, if desired.

Another methodology is to employ single fibers having an outer layer made of biodegradable polymer. After fusing such single fibers into a solid linear array (and geometrically shaping and/or adding additional material if desired), the inner material of such single fibers is removed. The resulting structure is a Parallel Channel Scaffold. In accordance with an embodiment, the inner material is chemically removed through a process such as dissolving. Further, in accordance with another embodiment, the inner material of single fibers is chemically dissolvable by a solvent that does not affect the single fibers' outer layer. Many biodegradable polymers are minimally or not affected by limited time exposure to water. As an example, the inner material of single fibers may be composed of a water-soluble polymer and their outer material may be composed of a biodegradable polymer that is unaffected or minimally effected by water. An example of such a water-soluble polymer is Poly vinyl alcohol (PVA).

Another methodology that may be employed to produce PCS is to fabricate individual fibers using materials that may be selectively dissolved away. A solid linear fiber array is immersed in a solvent that removes the material that was the single fiber's outer layer. The remaining structure is a Parallel Channel Scaffold Template. A biodegradable polymer is then potted around the PCST. After potting, (and shaping if desired) the material that was the inner material of the single fibers is dissolved away. The resulting structure is a PCS. Further processing (such as the infusion of growth factors or other chemicals) may be desired, but is not a subject of the present invention. The choice of materials to use for the single fibers is quite large and varied, but includes examples such as those listed below.

For example, PMMA may be used for the inner material and polystyrene (PS) for the outer material of PCS/PCST single fibers. Cyclohexane may then be used to dissolve the PS without affecting the PMMA. Acetone may then be used to dissolve the PMMA after potting the biodegradable polymer.

Another example is to use PS as the inner material and PMMA as the outer material of single fibers. Alcohol may then be used to dissolve away the PMMA and leave the PS unaffected. Acetone or cyclohexane may then be used to dissolve the PMMA after potting the biodegradable polymer.

Another example is to use a water-soluble polymer such as PVA as either the inner or the outer material and to use another material that is not water-soluble but that is soluble as the second material. The outer material is then removed.

Another example is to use hot water-soluble and cold water-soluble materials for the inner and outer materials. The outer material is removed by either hot or cold water (depending on which material is used for the outer material). The biodegradable polymer is then potted around the remaining structure and the inner material is removed with the appropriate hot or cold water.

Another methodology that may be employed to produce a PCS is to fabricate individual fibers using materials that can be selectively dissolved away as described above. However, in this methodology, one of the original materials is replaced with a water-soluble material. The remaining original material is removed and replaced with a biodegradable polymer, followed by removing the water-soluble material that was used as a replacement previously.

In the above methodologies and examples, various rinsing and drying steps have been omitted, as well as other processing aids, such as the use of control environments (oven baking, etc.), and the use of ultrasonic vibrators to increase dissolving. Such omitted steps and processing aids are well known, and their detail is not included here so as to not obfuscate the description.

In another embodiment, the material that forms a scaffold is not biodegradable. In this case, all that is required to form a scaffold is to dissolve away unwanted material (generally an inner material of single fibers).

Parallel Channel Scaffold Templates and PCS may also be fabricated without the use of fiber depository channels. This is accomplished by stacking appropriate single fibers (including support structures if desired) and fusing them to form a PCS or PCST. This method may be desirable when fabricating templates and scaffolds with smaller single fiber counts; i.e. those PCS and PCST that contain only a handful of channels (e.g., less than 70). Such templates and scaffolds can find applications in the fabrication of thinner, peripheral nerve scaffolds. After fusing, such structures may be drawn to decrease their cross-section and increase their length, thereby increasing fabrication efficiencies; i.e. a short structure with a relatively large diameter may be drawn into several hundreds of meters of PCS or PCST product.

Figure 24A:
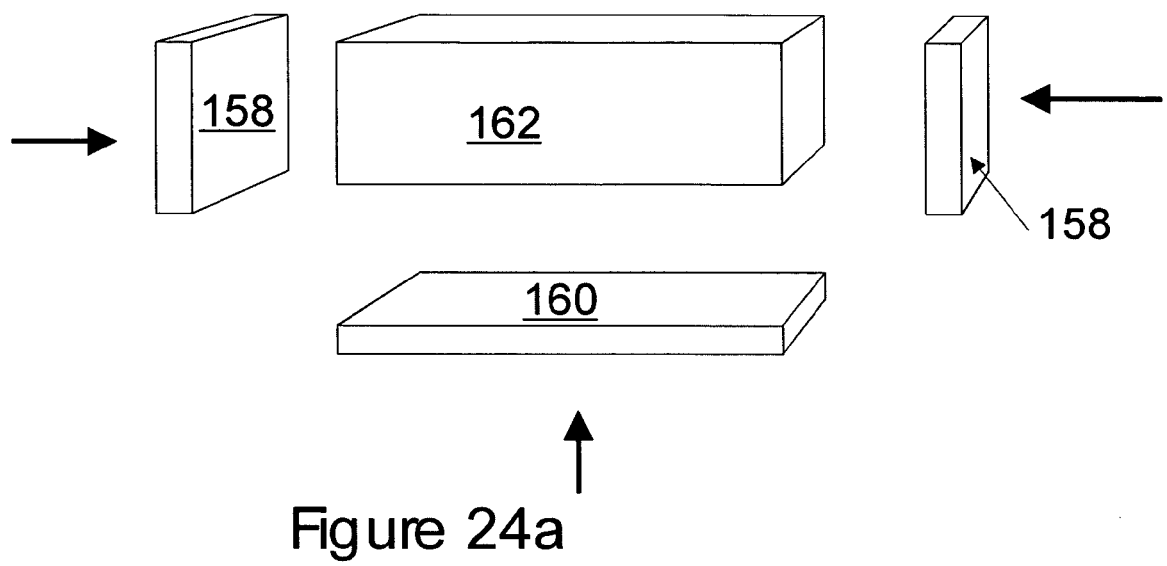
FIGS. 24a –b show construction of a scaffold.
Figure 24B:
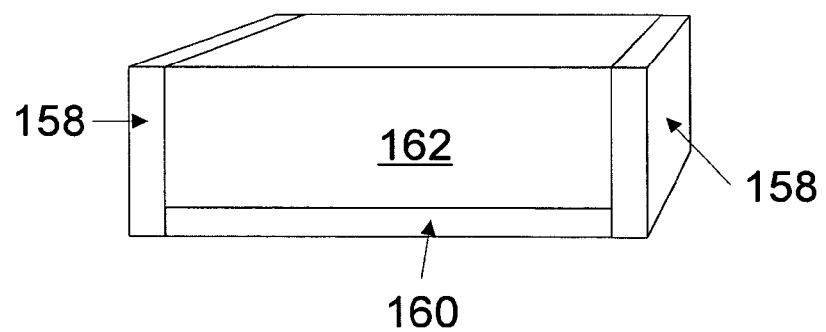

In preceding examples where outer material is dissolved away from a PCS or PCST, it is generally a requirement that there exist some means of supporting the PCS/PCST structure such that when outer material is removed, the structure does not collapse. If a length of a fused fiber array has its outer material removed completely without another means of support it would collapse into a large number of individual fibers; this is most likely an undesirable outcome. To overcome this problem, the ends of a solid linear fiber array are bonded (by known methods) to another material that is not adversely affected by the same solvent used to dissolve the outer material. End blocks 158 (FIGS. 24a and 24b) serve to hold the fibers in alignment after the outer material is removed. In many cases, end blocks 158 must be properly tensioned to maintain fiber spacing after the removal of outer material. Tension may be provided by bonding another material, a "tension member" 160, to the sides of the structure. A structure employing both end blocks and a tensioning member is shown in FIGS. 24a and 24b. The two end blocks 158 and the tensioning member 160 are bonded to a linear array 162. Tension may also be provided by using appropriate materials for construction of fiber depositories.

Figure 25:
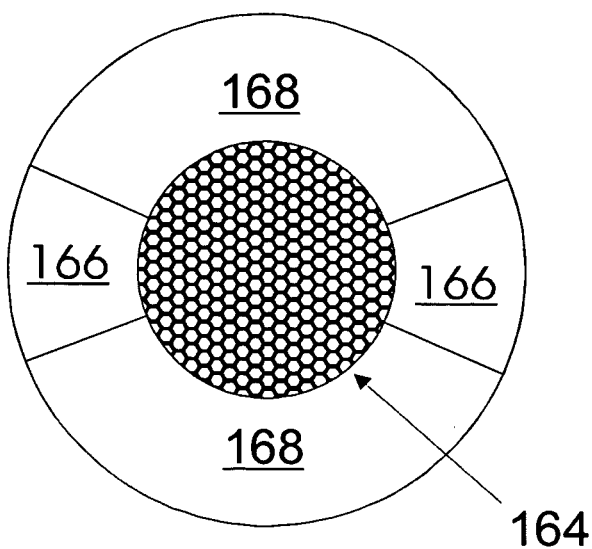
FIG. 25 shows a template structure.
Figure 26:
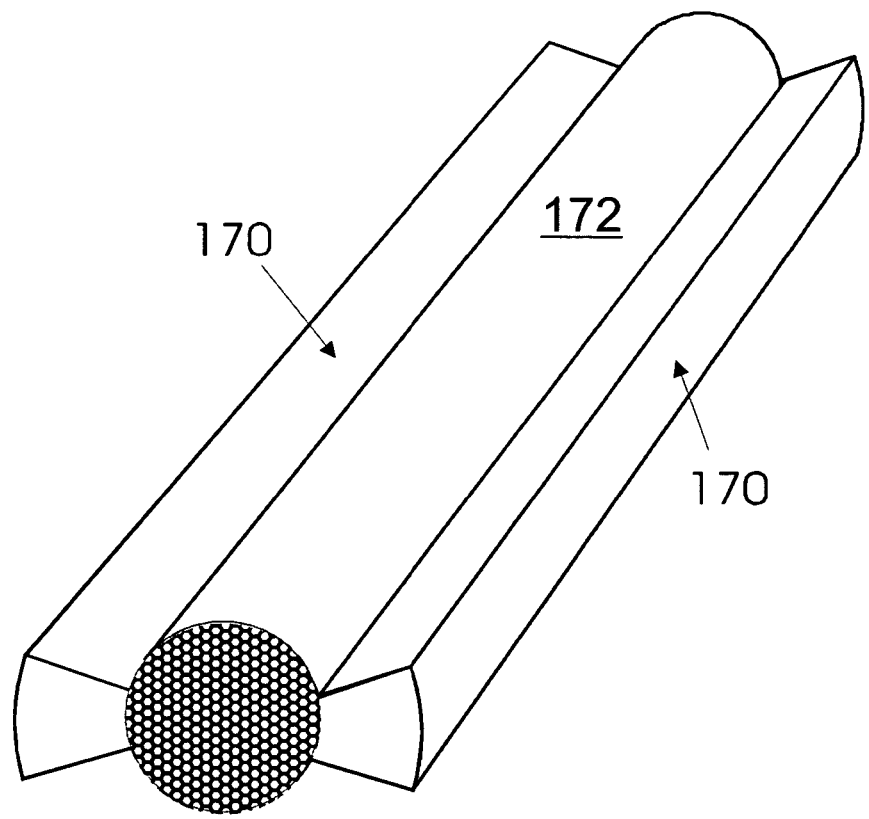
FIG. 26 shows a scaffold structure prior to removal of "wings"

In another embodiment, a structure such as that shown in FIG. 25 is assembled. A central array 164 may be a shaped linear array or an assembled array. Outer materials 166 and 168 are added. Integral tensioning members 168 and sacrificial material 168 are bonded to array 164. The structure in FIG. 25 may be drawn to reduce its dimensions. End blocks are bonded to a desired length of structure. Sacrificial material 168 (which may be the same material as the outer layer of individual fibers) may be dissolved away. Another material may then be potted around the remaining structure. The remaining original material may then be removed, leaving a structure as shown in FIG. 26. Support "wings" 170 may then be removed if desired, leaving a parallel channel scaffold. The use of tensioning elements shown in FIGS. 24–26 may not be necessary if tension is to be supplied via alternative means.

Fiber Array Scaffolds and Fiber Array Scaffole Templates

Fiber array scaffolds are arrays of space-separated fibers. Scaffolds used in this manner may be used to grow muscular tissue (among other tissues). Such scaffolds may be composed of biodegradable material or non-biodegradable material, depending on the outcomes desired. Often it is desirable that a scaffold not be made from biodegradable materials. In this case, after tissue has grown sufficiently about single fibers, single fibers are removed (they are usually slid out). An example of this type of structure is the single fiber 152 shown in FIG. 22. After bonding to end block and tensioning members (if desired), outer material 154 may be dissolved away, leaving a fiber array scaffold.

Fiber array scaffolds may be fabricated in at least two ways. A fused linear fiber array (with or without additional material around the array) has the outer cladding of single fibers removed. To realize a functional scaffold, the fibers arrays must usually be fixed at one or both ends. This may be accomplished in at least two ways. In one embodiment, a length of the fused fiber array is bonded in between two supporting structures (end blocks) and tensioning members as discussed previously.

Example 5

Space Separated Arrays

Space Separated Arrays contain an array of elements (fibers or posts) that are physically separated from each other in a regular array. This may be imagined as the inverse of multi-hole arrays. One or both ends of the array are held in alignment with additional material. Prior art methods used to fabricate space separated arrays include physical fiber alignment devices and photolithography, among others.

Several different methods can be employed to fabricate space-separated arrays. These methods are similar to those presented earlier. A linear array (capillary array, solid array or combination) with or without additional material present is sliced into sections and bonded at one or both ends to a substrate. If the core materials present in the array are the desired space separated array materials, all that is required is to dissolve away the cladding(s), the remaining structure is then a space separated array. If the core materials are not the materials of choice, they may be dissolved away and replaced with the desired materials(s). This replacement may be accomplished by potting, sputtering, vapor disposition, spin coating, or any other known method. If the original single fibers chosen to fabricate the array have different core materials, different materials may be used to replace the different core materials. This may be accomplished by first dissolving one core material, performing a first replacement, then dissolving the other materials, and performing a second replacement. In many cases, it may be desirable to remove the cladding material. This removal may be accomplished by dissolving, if desired. A top substrate may also be bonded to the array either before or after material removal of the cladding materials.

Figure 27:
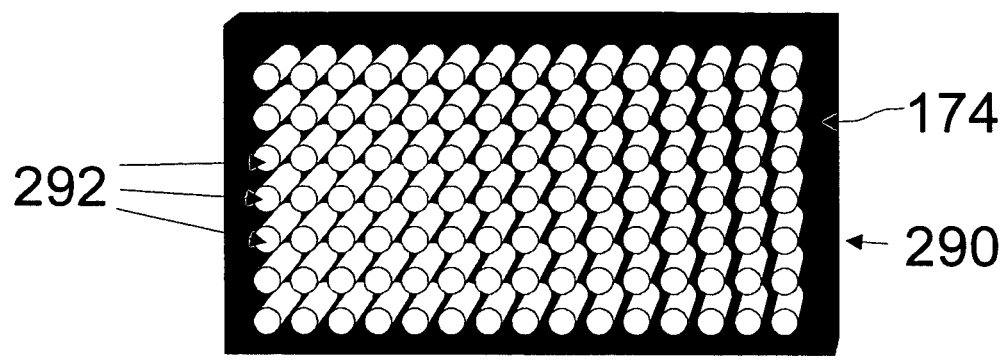
FIG. 27 shows a space-separated array.
Figure 28:
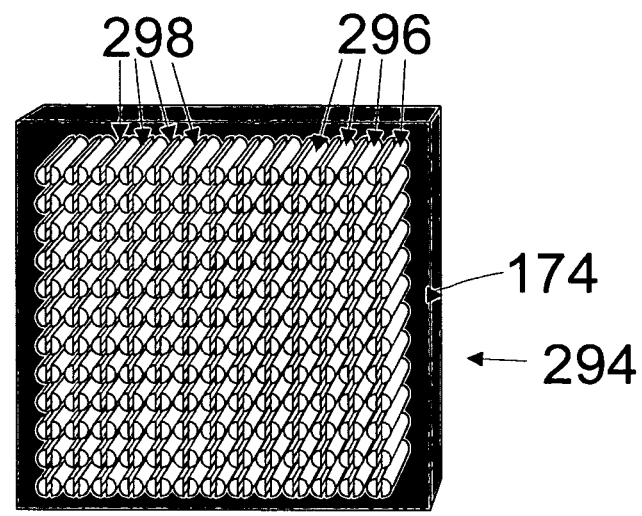
FIG. 28 shows another space-separated array manufactured using the single fibers of FIG. 10b, 10e, 11b or 11e.

An example of a space-separated array 290 is shown in FIG. 27. In this figure, a circular post array 292 is shown mounted on a substrate 174. FIG. 28 shows another space-separated array 294 manufactured using the single fibers of FIG. 10*b*, 10*e*, 11*b*, or 11*e*. It is important to note that the different hemi-spherical posts 296, 298 can be different materials, such as would be required for thermal photovoltaic devices, and thermal electric devices.

Figure 29:
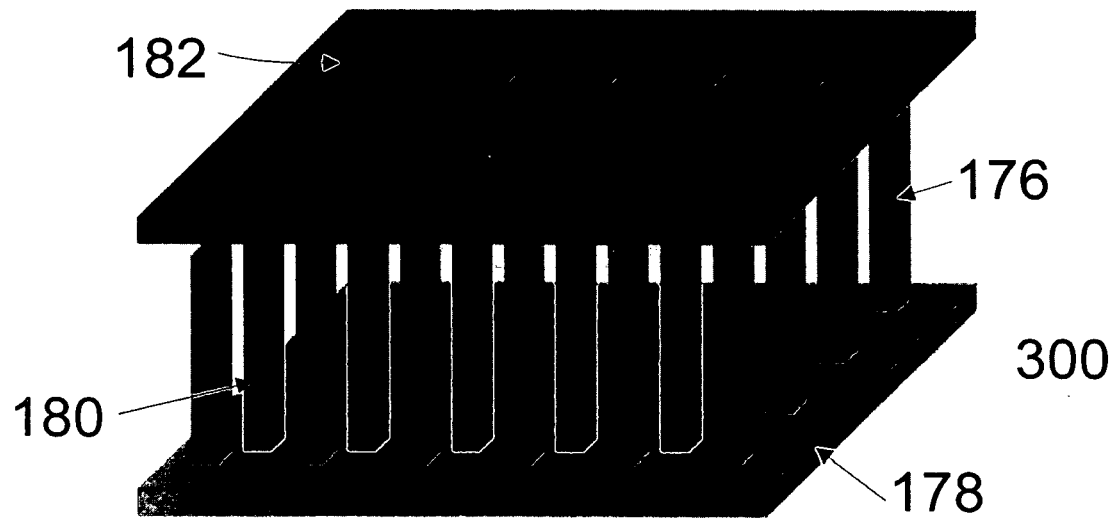
FIG. 29 shows a space-separated array having contained therein two sets of post of different materials.

FIG. 29 shows a space-separated array 300 wherein are contained two sets of posts 176, 180 of different materials. One post material 180 is bonded to a top substrate 182 and one post material 176 is bonded to a bottom substrate material 178.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a fiber array, comprising:
rolling a polymer fiber onto a depository wheel having a plurality of fiber depositories thereon, said rolling resulting in the polymer fiber being wound at least two times through each fiber depository so that each fiber depository includes a plurality of fiber lengths therein; and
fusing the plurality of fiber lengths in the fiber depositories to form the fiber array.

2. The method of claim 1, further comprising, prior to rolling the polymer fiber, drawing a polymer fiber preform to form the polymer fiber.

3. The method of claim 2, wherein drawing occurs in line with the rolling.

4. The method of claim 1, further comprising drawing the fiber array so as to reduce a cross, section of the fiber array.

5. The method of claim 4, further comprising:
rolling the drawn fiber array onto a depository wheel having a second plurality of fiber depositories thereon, said rolling resulting in the drawn fiber array being wound at least two times through each fiber depository of the second plurality of fiber depositories so that each fiber depository includes a plurality of drawn fiber arrays therein; and fusing the plurality of drawn fiber arrays in each of the second plurality of fiber depositories so as to form an array of fiber arrays.

6. The method of claim 5, further comprising drawing the array of fiber arrays so as to reduce a cross section of the array of fiber arrays.

7. The method of claim 6, further comprising:

rolling the drawn array of fiber arrays onto a depository wheel having a third plurality of fiber depositories thereon, said rolling resulting in the drawn array of fiber arrays being wound at least two times through each fiber depository of the third plurality of fiber depositories so that each fiber depository includes a plurality of drawn arrays of fiber arrays therein; and fusing the plurality of drawn arrays of fiber arrays in each of the second plurality of fiber depositories.

8. The method of claim 1, wherein the plurality of fiber depositories are each made of a polymer material, and further comprising, in the fusing act, for each fiber depository, fusing the fiber depository to the plurality of fiber lengths.

9. The method of claim 8, further comprising, prior to fusing, removing the plurality of depositories.

10. The method of claim 1, further comprising, prior to fusing, removing the plurality of depositories.

11. The method of claim 1, wherein the polymer fiber comprises a solid fiber.

12. The method of claim 1, wherein the polymer fiber comprises a capillary fiber.

13. The method of claim 1, wherein the polymer fiber comprises a composite structure comprising one or more cores and one or more claddings.

14. The method of claim 13, further comprising removing a core of the composite structure after fusing.

15. The method of claim 13, further comprising removing a cladding of the composite structure after fusing to form a space-separated array.

16. The method of claim 15, further comprising, after removing the cladding, potting another material around the space-separated array.

17. The method of claim 1, further comprising adding a second fiber formed of a different material composition than the polymer fiber to the plurality of fiber depositories prior to fusing.

18. A fiber array made in accordance with the method of claim 1.

* * * * *